(12) United States Patent
Li et al.

(10) Patent No.: US 11,912,938 B2
(45) Date of Patent: Feb. 27, 2024

(54) COATED PROPPANTS AND METHODS OF MAKING AND USE THEREOF

(71) Applicants: Saudi Arabian Oil Company, Dhahran (SA); Alfaisal University, Riyadh (SA)

(72) Inventors: Wengang Li, Dhahran (SA); Edreese Alsharaeh, Riyadh (SA); Mohan Raj Krishnan, Riyadh (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 0 days.

(21) Appl. No.: 18/322,668

(22) Filed: May 24, 2023

(65) Prior Publication Data
US 2023/0313027 A1 Oct. 5, 2023

Related U.S. Application Data

(62) Division of application No. 17/395,981, filed on Aug. 6, 2021, now Pat. No. 11,702,587.

(51) Int. Cl.
*C09K 8/80* (2006.01)

(52) U.S. Cl.
CPC .......... *C09K 8/805* (2013.01); *C09K 2208/10* (2013.01)

(58) Field of Classification Search
CPC ...................................................... C09K 8/62
See application file for complete search history.

(56) References Cited

U.S. PATENT DOCUMENTS

| 5,597,784 A | 1/1997 | Sinclair et al. |
| 6,258,157 B1 | 7/2001 | Gordon |

(Continued)

FOREIGN PATENT DOCUMENTS

| CN | 105849359 B | 1/2020 |
| CN | 108165253 B | 3/2021 |

(Continued)

OTHER PUBLICATIONS

Notification of Transmittal of the International Search Report and the Written Opinion of the International Searching Authority, or the Declaration dated Oct. 25, 2022 pertaining to International application No. PCT/US2022/037240 filed Jul. 15, 2022, 16 pages.

(Continued)

*Primary Examiner* — William D Hutton, Jr.
*Assistant Examiner* — Avi T Skaist
(74) *Attorney, Agent, or Firm* — DINSMORE & SHOHL LLP

(57) ABSTRACT

Coated proppants include a proppant particle, a surface copolymer layer surrounding the proppant particle, and a resin layer surrounding the surface copolymer layer. The surface copolymer layer includes a copolymer of at least two monomers chosen from styrene, methyl methacrylate, ethylene, propylene, butylene, imides, urethanes, sulfones, carbonates, and acrylamides, where the copolymer is crosslinked by divinyl benzene. The resin layer includes a cured resin. Methods of preparing the coated proppants include preparing a first mixture including at least one polymerizable material, an initiator, and a crosslinker including divinyl benzene; contacting the first mixture to a proppant particle to form a polymerization mixture; heating the polymerization mixture to cure the polymerizable material and form a polymer-coated particulate; preparing a second mixture including the polymer-coated substrate, an uncured resin, and a solvent; and adding a curing agent to the second mixture to cure the uncured resin and form the coated proppant.

20 Claims, 10 Drawing Sheets

(56) References Cited

U.S. PATENT DOCUMENTS

| | | |
|---|---|---|
| 7,153,575 B2 | 12/2006 | Anderson et al. |
| 7,867,613 B2 | 1/2011 | Smith et al. |
| 8,298,667 B2 | 10/2012 | Smith et al. |
| 8,557,916 B1 | 10/2013 | Alsharaeh et al. |
| 9,403,115 B2 | 8/2016 | Majumder et al. |
| 9,938,454 B2 | 4/2018 | Tanguay et al. |
| 10,011,674 B2 | 7/2018 | Viswanath et al. |
| 10,017,689 B2 | 7/2018 | Nguyen et al. |
| 10,036,239 B2 | 7/2018 | Salla et al. |
| 2008/0135245 A1 | 6/2008 | Smith et al. |
| 2011/0278003 A1 | 11/2011 | Rediger |
| 2012/0205101 A1 | 8/2012 | Pribytkov et al. |
| 2015/0119301 A1 | 4/2015 | McDaniel et al. |
| 2016/0024376 A1 | 1/2016 | Fitzgerald et al. |
| 2016/0032179 A1 | 2/2016 | Tanguay et al. |
| 2016/0075941 A1* | 3/2016 | Duenckel .............. C09K 8/665 507/202 |
| 2017/0247608 A1 | 8/2017 | Raysoni et al. |
| 2017/0327729 A1 | 11/2017 | Salla et al. |
| 2018/0134949 A1 | 5/2018 | Monastiriotis et al. |
| 2019/0002756 A1 | 1/2019 | Kincaid et al. |
| 2020/0325390 A1* | 10/2020 | Reddy .................... C09K 8/62 |
| 2021/0062076 A1 | 3/2021 | Li |

FOREIGN PATENT DOCUMENTS

| | | |
|---|---|---|
| EP | 2092039 B1 | 7/2011 |
| WO | 2011050046 A1 | 4/2011 |
| WO | 2011146186 A2 | 11/2011 |
| WO | 2013033391 A1 | 3/2013 |
| WO | 2013192634 A2 | 12/2013 |
| WO | 2015048021 A2 | 4/2015 |
| WO | 2018031915 A1 | 2/2018 |
| WO | 2021257243 A1 | 12/2021 |
| WO | 2021257823 A1 | 12/2021 |

OTHER PUBLICATIONS

U.S. Notice of Allowance and Fee(s) Due dated Mar. 15, 2022 pertaining to U.S. Appl. No. 16/553,328, filed Aug. 28, 2019, 15 pages.

International Search Report and Written Opinion dated Oct. 5, 2021 pertaining to International Application No. PCT/US2021/037819 filed Jun. 17, 2021, 15 pages.

De Campos et al., "Hydraulic fracturing proppants", Ceramica, vol. 64, 2018, pp. 219-229.

International Search Report and Written Opinion dated Apr. 28, 2020 pertaining to International Application No. PCT/US2019/057168 filed Oct. 21, 2019, 11 pgs.

Gidley et al., "Effect of Proppant Failure and Fines Migration on Conductivity of Propped Fractures", SPE Production & Facilities, Feb. 1995, pp. 20-25.

Nguyen et al., "A New Approach for Enhancing Fracture Conductivity", Society of Petroleum Engineers, SPE 50002, 1998, 14 pgs.

Wang et al., "Reinforced performances of polymethyl methacrylate/silica fume composite spherical particles used as ultra-lightweight proppants", Journal of Reinforced Plastics & Composites, vol. 34(8), 2015, pp. 672-683.

Han et al., "Synthesis of Low-Density Heat-Resisting Polystyrene/Graphite Composite Microspheres Used as Water Carrying Fracturing Proppants", Polymer-Plastics Technology and Engineering, vol. 53, 2014, pp. 1647-1653.

Rickards et al., "High Strength, Ultralightweight Proppant Lends New Dimensions to Hydroaulic Fracturing Applications", Society of Petroleum Engineers, SPE 84308, May 2006, pp. 212-221.

Zhang et al., "Ultra-lightweight composite proppants prepared via suspension polymerization", Journal of Composite Materials, vol. 0(0), 2015, pp. 1-9.

Liang et al., "A comprehensive review on proppant technologies", Petroleum, 2015, pp. 1-14.

Zoveidavianpoor et al., "Application of polymers for coating of proppant in hydraulic fracturing of subterraneous formations: A comprehensive review", Journal of Natural Gas Science and Engineering 24, 2015, pp. 197-209.

Hu et al., "Proppants Selection Based on Field Case Studies of Well Production Performance in the Bakken Shale Play", Society of Petroleum Engineers, SPE-169556-MS, 2014 (20 pages).

Xu et al., "Study on Preparation and Properties of PMMA composite microspheres as the matrix of low density proppant", Applied Mechanics and Materials vols. 457-458, 2014, pp. 116-119.

Gianotti et al., "On the Thermal Stability of PS-b-PMMA Block and P(S-r-MMA) Random Copolymers for Nanopatterning Applications", Macromolecules, vol. 46, 2013, pp. 8224-8234.

Chuai et al., "Thermal Behavior and Properties of Polystyrene/Poly(methyl methacrylate) Blends", Journal of Applied Polymer Science, vol. 91, 2004, pp. 609-620.

Pangilinan et al., "Polymers for proppants used in hydraulic fracturing", Journal of Petroleum Science and Engineering, Manuscript, Mar. 30, 2016 (23 pages).

Alsharaeh et al., "Evaluation of Nanomechanical Properties of (Styrene-Methyl Methacrylate) Copolymer Composites Containing Graphene Sheets", Industrial & Engineering Chemistry Research, vol. 52, 2013, pp. 17871-17881.

Fereidoon et al., "Nanomechanical and Nanoscratch Performance of Polystyrene/Poly(methyl methacrylate)/Multi-Walled Carbon Nanotubes Nanocomposite Coating", Polymer Composites, 2017, 7 pgs.

GCC First Office Action dated Jan. 31, 2021 which pertains to GCC Patent Application No. 2019-38861, filed Dec. 18, 2019, 3 pages.

International Search Report and Written Opinion dated Sep. 8, 2021 pertaining to International application No. PCT/US2021/033636 filed May 21, 2021, 15 pages.

U.S. Office Action dated Oct. 5, 2021 pertaining to U.S. Appl. No. 16/553,328, filed Aug. 28, 2019, 22 pages.

* cited by examiner

COATED PROPPANTS AND METHODS OF MAKING AND USE THEREOF

CROSS-REFERENCE TO RELATED APPLICATION

This application claims priority to U.S. Non-provisional patent application Ser. No. 17/395,981 filed Aug. 6, 2021, entitled COATED PROPPANTS AND METHODS OF MAKING AND USE THEREOF, the contents of which are hereby incorporated by reference in its entirety.

TECHNICAL FIELD

Embodiments of the present disclosure generally relate to proppants for hydraulic fracturing processes.

BACKGROUND

Proppants such as fracking sands are widely incorporated into hydraulic fracturing processes. The ability of a proppant to hold subterranean fractures open in general is limited by the mechanical strength of the proppant. Fracking sands, for example, have limited use as proppant materials in high-pressure processes that are conducted at greater than 4000 pounds-per-square-inch (psi), owing to brittleness of individual grains and their tendency to be crushed under the high pressures.

SUMMARY

It is often desirable during and after fracturing a subsurface formation to hold the fractures open through the use of proppants for more effective oil and gas production than without. However, sand particles, which are used as a proppant, may not provide sufficient crush resistance for use in a given subsurface formation due to the polycrystalline nature of the grains. Conventional uncoated proppant break under downhole stress. Ceramic proppants break down in wet conditions, which cause them to lose their crush resistance. Temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a greater area of the coated proppant particle. In turn, the distribution of force along a greater area should result in a decrease in the amount of crushed proppant particles, also known as "the crush percentage." Additionally, a proppant coating may impart strength to the proppant, increasing elastic modulus, hardness, and even degradation temperature. The proppant coating also adheres to the proppant and prevents proppant that is crushed from releasing proppant fines. Proppant fines may migrate into the formation and restrict flow conductivity of the formation.

Accordingly, a need exists for a strong, chemically-resistant proppant coating. Using resin in the proppant coating prevents crushing, fines migration, proppant flowback and breakdown of the proppant particle. The dispersion of strengthening agents enhances the mechanical strength of the coating materials, shown through increased degradation temperature, elastic modulus, and hardness. The dispersion of strengthening agent further provide resistance to the chemicals present in hydraulic fracturing fluid.

In one embodiment, the present disclosure relates to a coated proppant including a proppant particle, a surface copolymer layer surrounding the proppant particle, and a resin layer surrounding the surface copolymer layer, the resin layer comprising a cured resin. The surface copolymer layer comprises a copolymer of at least two monomers chosen from styrene, methyl methacrylate, ethylene, propylene, butylene, imides, urethanes, sulfones, carbonates, and acrylamides, where the copolymer is crosslinked by divinyl benzene.

In another embodiment, the present disclosure relates to a method of preparing a coated proppant including preparing a first mixture comprising a polymerizable material, an initiator, and a crosslinker comprising divinyl benzene. The method further includes contacting the first mixture to a proppant particle to form a polymerization mixture, heating the polymerization mixture to cure the polymerizable material and form a polymer-coated proppant particle comprising the proppant particle and a surface copolymer layer crosslinked via divinyl benzene, the surface copolymer layer surrounding the particulate substrate. The method further includes preparing a second mixture comprising the polymer-coated substrate and an uncured resin, and adding a curing agent to the second mixture to cure the uncured resin and form the coated proppant, the coated proppant comprising the proppant particle, the surface copolymer layer surrounding the proppant particle, and a resin layer surrounding the surface copolymer layer, the resin layer comprising a cured resin.

Additional features and advantages of the embodiments described in this disclosure will be set forth in the detailed description which follows, and in part will be readily apparent to those skilled in the art from that description or recognized by practicing the embodiments described in this disclosure, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure and, together with the description, serve to explain the principles and operations of the claimed subject matter.

DETAILED DESCRIPTION

Reference will now be made in detail to embodiments of coated proppants. The coated proppants include a surface copolymer layer surrounding a proppant particle and a resin layer surrounding the surface copolymer layer. The surface copolymer layer, the resin layer, or both the surface copolymer layer and the resin layer may include a filler material. The layers surrounding the coated proppants may increase the crush strength of the proppant particle by imparting additional mechanical stability generally from the added layers, or by increasing the roundness and the sphericity of individual particles. The coated proppants according to embodiments may exhibit mechanical properties, including but not limited to crush strengths, rendering the coated proppants suitable for use as proppants in fracking operations that require particle stability at temperatures and pressures commonly encountered within fracking fissures.

Figure 1:
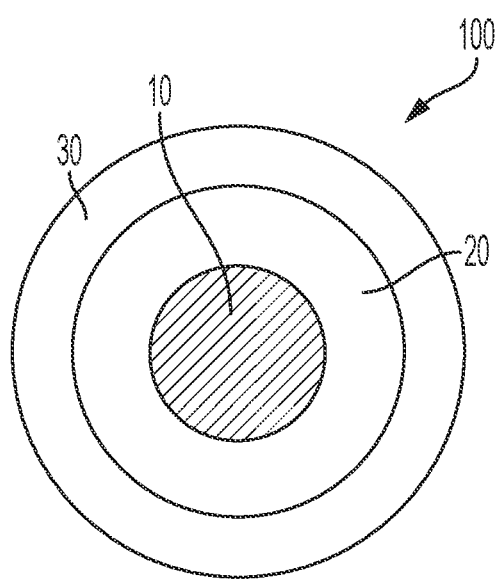
FIG. 1 is a schematic diagram of a coated proppant according to embodiments, in which a proppant particle is surrounded by a surface copolymer layer and in which the surface copolymer layer is surrounded by a resin layer.

Referring to FIG. 1, a coated proppant 100 according to embodiments includes a proppant particle 10. The proppant particle 10 is surrounded by a surface copolymer layer 20. The surface copolymer layer includes a copolymer of at least two monomers chosen from styrene, methyl methacrylate, ethylene, propylene, butylene, imides, urethanes, sulfones, carbonates, and acrylamides. The surface copolymer layer 20 is surrounded by a resin layer 30. The resin layer 30 includes a cured resin. The proppant particle 10, the surface copolymer layer 20, and the resin layer 30 each will be described now in greater detail.

The proppant particle 10 may be chosen from any type of particle material suitable for use in hydraulic fracturing (fracking) applications. In hydraulic fracturing, proppants are propping agent particles added to hydraulic fracturing fluids to maintain and hold open subterranean fractures during or following subterranean treatment. In some embodiments, the proppant particle 10 may include particles of materials such as oxide, silicate, sand, ceramic, resin, plastic, mineral, glass, silica, alumina, fumed carbon, carbon black, graphite, mica, titania, zirconia, boron, fly ash, or combinations thereof. For example, the proppant particle 10 may comprise sand such as a graded sand, a treated sand, a ceramic proppant, or a plastic proppant. Treated sands may include sands having surfaces modified by a polymerization initiator. The proppant particle 10 may include particles of bauxite or of sintered bauxite. The proppant particle 10 may include glass particles or glass beads. The proppant particle 10 may include particles generally resistant to deformation under pressure or at elevated temperature. The proppant particle 10 may include particulate materials that do not melt at a temperature less than 300 degrees Celsius (300° C.), less than 250° C., less than 200° C., less than 150° C., or less than 100° C., for example.

Figure 3:
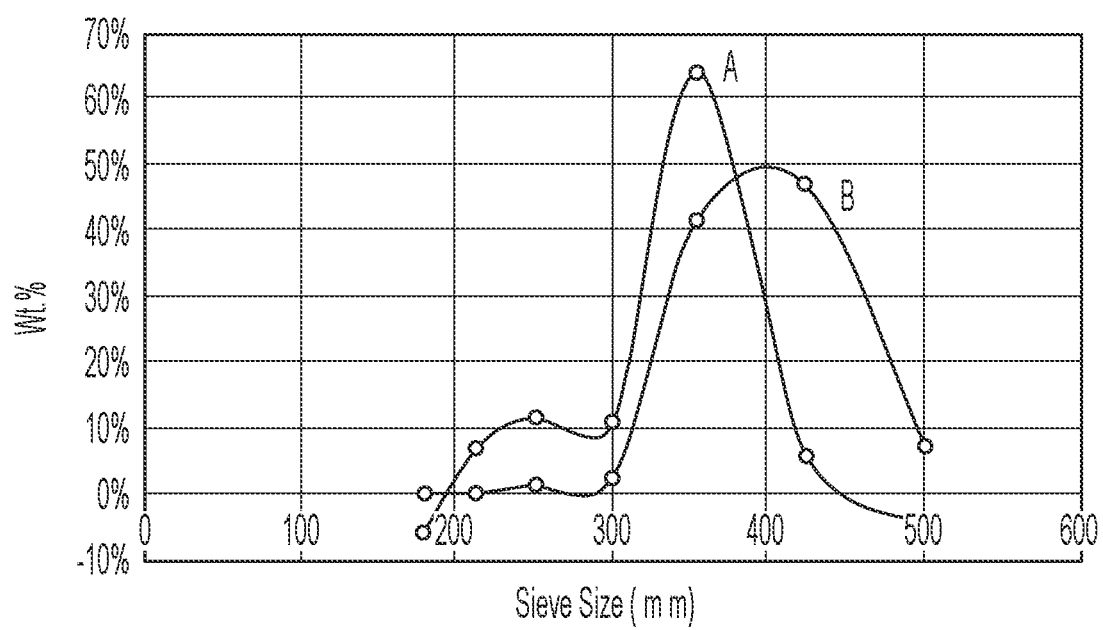
FIG. 3 is a graph of particle size distributions of (A) a neat particulate substrate and (B) coated particles according to embodiments, in which a particulate substrate is surrounded by a surface copolymer layer and in which the surface copolymer layer is surrounded by a resin layer.

The proppant particle 10 may have any size, size distribution, and shape common to proppant particles for hydraulic fracturing. In some embodiments, the proppant particle 10 may include particles having sizes from 8 mesh to 140 mesh (diameters from 106 micrometers (μm) to 2.36 millimeters (mm)). In some embodiments, the proppant particle 10 may include particles having sizes from 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). FIG. 3 is a graph of exemplary particle size distributions of (A) an untreated sand suitable as a particulate substrate; and (B) coated particles according to embodiments, in which the sand particulate substrate is surrounded by a surface copolymer layer of polystyrene-co-poly(methyl methacrylate) and in which the surface copolymer layer is surrounded by a resin layer of a cured epoxy resin.

The sphericity and roundness of individual particles of the proppant particle 10 may vary. As will be described subsequently, however, in the coated proppants 100 according to embodiments, the additions of the surface copolymer layer 20 and the resin layer 30 to the proppant particle 10 may increase roundness, sphericity, or both roundness and sphericity of the proppant particle 10 and, in turn, impart mechanical stability and greater crush strength to the proppant particle 10.

The coated proppants 100 according to embodiments further include a surface copolymer layer 20 surrounding or coating the proppant particle 10. The surface copolymer layer 20 is or includes a copolymer of at least two monomers chosen from styrene, methyl methacrylate, ethylene, propylene, butylene, imides, urethanes, sulfones, carbonates, and acrylamides. The copolymer of the surface copolymer layer 20 may be crosslinked by divinyl benzene, di-isopropyl benzene, 1,2,4 trivinyl cyclohexane, bisphenyl acetylene triphenyl dicarboxylic acid, bisallyloxy benzene 1,4 dicarboxylic acid, 2,2 bis[(allyloxy) methyl] propane 1,3 diol, or combinations thereof.

In embodiments, the surface copolymer layer 20 may be or may include a copolymer of primary comonomers and secondary comonomers. In such embodiments, the primary comonomers are monomer units of a single chemical structure that compose the greatest portion by weight of the entire copolymer, compared to any other monomer units in the copolymer. Also in such embodiments, the secondary comonomers may all have identical structures or may be a combination of from 2 to 10, from 2 to 8, from 2 to 5, or from 2 to 3, different structures. When the secondary comonomers all have identical chemical structures, the copolymer is composed of from 50 weight percent (wt. %) to 95 wt. %, or greater than or equal to 50 wt. %, greater than or equal to 60 wt. %, greater than or equal to 70 wt. %, greater than or equal to 80 wt. %, or greater than or equal to 90 wt. % primary comonomer, based on the total weight of the copolymer, the remainder of the copolymer being composed of the single type of secondary comonomer. When the secondary comonomers are a combination of greater than one type of comonomer, the copolymer may be composed of from 20 wt. % to 95 wt. % primary monomer and from 5 wt. % to 80 wt. % total secondary monomers, based on the total weight of the copolymer. The copolymer may comprise random copolymer, a block copolymer, or a graft copolymer.

In embodiments, the surface copolymer layer may comprise a polystyrene, such as a styrene copolymer having styrene units as primary comonomers and at least one secondary comonomer chosen from methyl methacrylate, ethylene, propylene, butylene, imides, urethanes, sulfones, carbonates, and acrylamides. In embodiments, the surface copolymer layer may comprise a poly(methyl methacrylate), such as a methyl methacrylate copolymer having methyl methacrylate units as primary comonomers and at least one secondary comonomer chosen from styrene, ethylene, propylene, butylene, imides, urethanes, sulfones, carbonates, and acrylamides. In embodiments, the surface copolymer layer may comprise a polyethylene, such as an ethylene copolymer having ethylene units as primary comonomers and at least one secondary comonomer chosen from styrene, methyl methacrylate, propylene, butylene, imides, urethanes, sulfones, carbonates, and acrylamides. In embodiments, the surface copolymer layer may comprise a polypropylene, such as a propylene copolymer having propylene units as primary comonomers and at least one secondary comonomer chosen from styrene, methyl methacrylate, ethylene, butylene, imides, urethanes, sulfones, carbonates, and acrylamides. In embodiments, the surface copolymer layer may comprise a polybutylene, such as a butylene copolymer having butylene units as primary comonomers and at least one secondary comonomer chosen from styrene, methyl methacrylate, ethylene, propylene, imides, urethanes, sulfones, carbonates, and acrylamides. In embodiments, the surface copolymer layer may comprise a polyimide, such as an imide copolymer having imide units as primary comonomers and at least one secondary comonomer chosen from styrene, methyl methacrylate, ethylene, propylene, butylene, urethanes, sulfones, carbonates, and acrylamides. In embodiments, the surface copolymer layer may comprise a polyurethane, such as a urethane copolymer having urethane units as primary comonomers and at least one secondary comonomer chosen from styrene, methyl methacrylate, ethylene, propylene, butylene, imides, sulfones, carbonates, and acrylamides. In embodiments, the surface copolymer layer may comprise a polysulfone, such as a sulfone copolymer having sulfone units as primary comonomers and at least one secondary comonomer chosen from styrene, methyl methacrylate, ethylene, propylene, butylene, imides, urethanes, carbonates, and acrylamides. In embodiments, the surface copolymer layer may comprise a polycarbonate, such as a carbonate copolymer having carbonate units as primary comonomers and at least one secondary comonomer chosen from styrene, methyl methacrylate, ethylene, propylene, butylene, imides, sulfones, urethanes, and acrylamides. In embodiments, the surface copolymer layer may comprise a polyacrylamide, such as an acrylamide copolymer having acrylamide units as primary comonomers and at least one secondary comonomer chosen from styrene, methyl methacrylate, ethylene, propylene, butylene, imides, sulfones, urethanes, and carbonates.

In embodiments, the surface copolymer layer may comprise a copolymer of styrene and methyl methacrylate (a poly(stryrene-co-methyl methacrylate), referred to subsequently as PS-PMMA). The PS-PMMA may be composed of from 1 wt. % to 95 wt. % styrene monomer units and from 95 wt. % to 1 wt. % methyl methacrylate monomer units, where the sum of the weight of the styrene monomer units and the weight of the methyl methacrylate monomer units equals the total weight of the copolymer. In embodiments, the surface copolymer layer may comprise a PS-PMMA having an exemplary weight ratio of polystyrene units to poly(methyl methacrylate) units of 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or 99:1, or any ratio between any of two of these exemplary ratios, or any range of ratios from one of these exemplary ratios to another of these exemplary ratios.

As stated previously, the copolymer of the surface copolymer layer 20 may be crosslinked by divinyl benzene, di-isopropyl benzene, 1,2,4 trivinyl cyclohexane, bisphenyl acetylene triphenyl dicarboxylic acid, bisallyloxy benzene 1,4 dicarboxylic acid, 2,2 bis[(allyloxy) methyl] propane 1,3 diol, or combinations thereof. A crosslinker is a substance or agent that induces the subsurface formation of crosslinks. A crosslinked surface copolymer layer 20 may retain its shape without dissolving in a fluid, while maintaining a sufficient attraction or bond to the proppant particle 10. The degree of crosslinking may be controlled by the molar or weight ratio of crosslinker to monomer. In some embodiments, the crosslinker may comprise at least one of hexamethylenetetramine, paraformaldehyde, oxazolidines, melamine resins, aldehyde donors, or resole polymers. The coated proppant 100 may include from 0.1 to 20 wt. % crosslinker by weight of the surface copolymer layer 20, where the crosslinker includes divinyl benzene, di-isopropyl benzene, 1,2,4 trivinyl cyclohexane, bisphenyl acetylene triphenyl dicarboxylic acid, bisallyloxy benzene 1,4 dicarboxylic acid, 2,2 bis[(allyloxy) methyl] propane 1,3 diol, or combinations thereof. In embodiments the coated proppant 100 may include from 0.1 to 20 wt. %, from 0.1 to 17 wt. %, from 0.1 to 15 wt. %, from 0.1 to 13 wt. %, from 0.1 to 10 wt. %, from 0.1 to 8 wt. %, from 0.1 to 5 wt. %, from 0.1 to 3 wt. %, from 0.1 to 1 wt. %, from 1 to 20 wt. %, from 1 to 17 wt. %, from 1 to 15 wt. %, from 1 to 13 wt. %, from 1 to 10 wt. %, from 1 to 8 wt. %, from 1 to 5 wt. %, from 1 to 3 wt. %, from 3 to 20 wt. %, from 3 to 17 wt. %, from 3 to 15 wt. %, from 3 to 13 wt. %, from 3 to 10 wt. %, from 3 to 8 wt. %, from 3 to 5 wt. %, from 5 to 20 wt. %, from 5 to 17 wt. %, from 5 to 15 wt. %, from 5 to 13 wt. %, from 5 to 10 wt. %, from 5 to 8 wt. %, from 8 to 20 wt. %, from 8 to 17 wt. %, from 8 to 15 wt. %, from 8 to 13 wt. %, from 8 to 10 wt. %, from 10 to 20 wt. %, from 10 to 17 wt. %, from 10 to 15 wt. %, from 10 to 13 wt. %, from 13 to 20 wt. %, from 13 to 17 wt. %, from 13 to 15 wt. %, from 15 to 20 wt. %, from 15 to 17 wt. %, or from 17 to 20 wt. % crosslinker by weight of the surface copolymer layer 20, where the crosslinker includes divinyl benzene, di-isopropyl benzene, 1,2,4 trivinyl cyclohexane, bisphenyl acetylene triphenyl dicarboxylic acid, bisallyloxy benzene 1,4 dicarboxylic acid, 2,2 bis[(allyloxy) methyl] propane 1,3 diol, or combinations thereof.

In embodiments, the coated proppant 100 includes the resin layer 30 that surrounds the surface copolymer layer 20. The resin layer 30 includes a cured resin. The cured resin of the resin layer 30 may be any resin capable of being coated on a substrate in an uncured form and of curing on the substrate with or without catalysts, hardeners, crosslinking agents, or coupling agents, and with or without the application of heat, UV radiation, or other common curing processes. Examples of cured resins for the resin layer 30 include epoxy resins such as bisphenol A epoxy resins, bisphenol F epoxy resins, novolac epoxy resins, aliphatic epoxy resins, glycidylamine epoxy resins, and polyepoxide resins. Other suitable cured resins include, for example, phenol-aldehyde resins, urea-aldehyde resins, urethane resins, phenolic resins, furan resins, furan-furfuryl-alcohol resins, phenolic-latex resins, phenol formaldehyde resins, silicon-based resins, polyester resins, acrylate resins, and hybrids or copolymers of any of these.

Figure 2A:
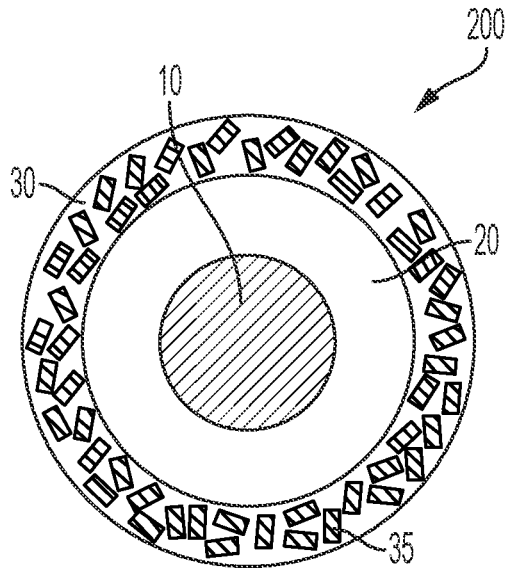
FIG. 2A is a schematic diagram of a coated proppant according to embodiments, in which a proppant particle is surrounded by a surface copolymer layer and in which the surface copolymer layer is surrounded by a resin layer containing a filler material.
Figure 2B:
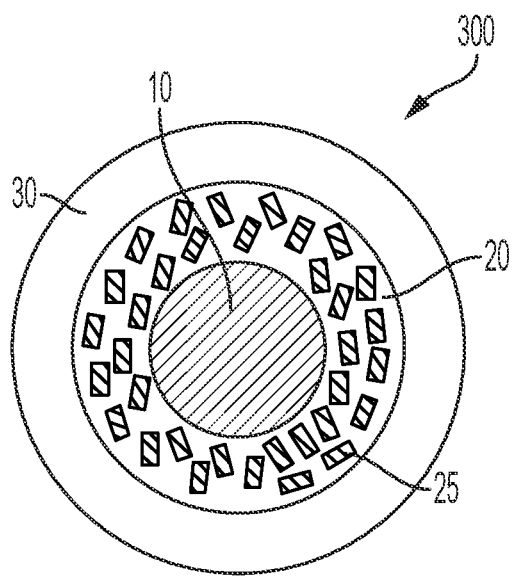
FIG. 2B is a schematic diagram of a coated proppant according to embodiments, in which a proppant particle is surrounded by a surface copolymer layer containing a filler material, and in which the surface copolymer layer is surrounded by a resin layer.
Figure 2C:
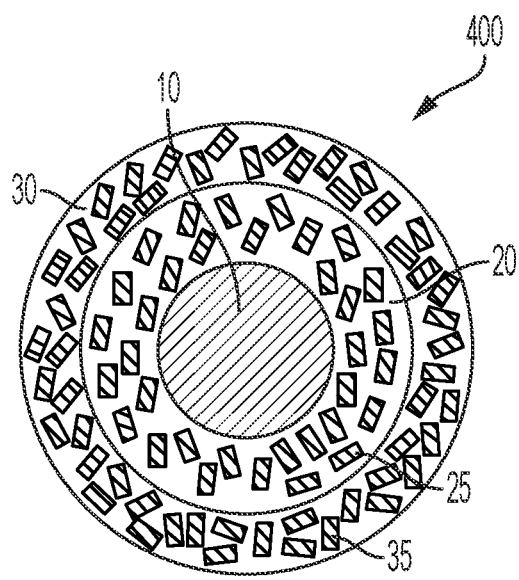
FIG. 2C is a schematic diagram of a coated proppant according to embodiments, in which a proppant particle is surrounded by a surface copolymer layer containing a filler material, and in which the surface copolymer layer is surrounded by a resin layer containing a filler material.

Referring now to FIGS. 2A-2C, the coated proppants 100 according to embodiments may further include at least one filler material 25, 35. The filler material 25, 35 may be added to the surface copolymer layer 20, to the resin layer 30, or to both the surface copolymer layer 20 and the resin layer 30. In the modified-resin coated proppant 200 of FIG. 2A, for example, the proppant particle 10 is surrounded by a surface copolymer layer 20 without a filler material, and the surface copolymer layer 20 is surrounded by a resin layer 30 that includes a filler material 35. In the modified-copolymer coated proppant 300 of FIG. 2B, for example, the proppant particle 10 is surrounded by a surface copolymer layer 20 including a filler material 25, and the surface copolymer layer 20 including the filler material 25 is surrounded by a resin layer 30 without a filler material. In the doubly-modified coated proppant 400 of FIG. 2C, for example, the proppant particle 10 is surrounded by a surface copolymer layer 20 including a filler material 25, and the surface copolymer layer 20 including the filler material 25 is surrounded by a resin layer 30 including a filler material 35. In the doubly-modified coated proppant 400, the filler material 25 in the surface copolymer layer 20 may be the same as or different from the filler material 35 in the resin layer 30.

The filler material 25, 35 may include silica, alumina, mica, graphene, vanadium pentoxide, zinc oxide, calcium carbonate, zirconium oxide, nano-reinforcing material, or combinations thereof. Nano-reinforcing materials may be any nanoparticulate material having an average particle size less than 1 micron (1000 nanometers), such as from 1 nanometer (nm) to 1000 nm, from 1 nm to 500 nm, from 10 nm to 500 nm, from 1 nm to 200 nm, from 1 nm to 100 nm, from 1 nm to 50 nm, from 1 nm to 25 nm, from 1 nm to 10 nm, or from 10 nm to 200 nm, for example, that is capable of mechanically strengthening a polymeric material when present within a matrix of the polymeric material. In embodiments, the nano-reinforcing material include carbon nanotubes, nano silica, nano alumina, nano mica, nanoclay, boron nitride nanotubes, nano vanadium pentoxide, nano zinc oxide, nano calcium carbonate, graphene nanoparticles, graphene oxide nanoparticles, reduced graphene oxide nanoparticles, heat-reduced graphene oxide nanoparticles, hexagonal boron nitride nanoparticles, silver nanoparticles, copper nanoparticles, zirconia nanoparticles, ZrG nanoparticles, ZrG5 nanoparticles, or combinations thereof. ZrG nanoparticles are nanocomposites of zirconium hydroxide (Zr(OH)$_4$) and graphene oxide. ZrG5 nanoparticles are nanocomposites of 95% by weight zirconium hydroxide (Zr(OH)$_4$) and 5% by weight graphene oxide.

Carbon nanotubes comprise at least one of single-walled nanotubes, double-walled nanotubes, multi-walled carbon nanotubes, or narrow-walled nanotubes. The carbon nanotubes have a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm; a length of from 20 to 500 μm, 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm; an aspect ratio of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000; and a specific surface area of from 100 to 12,000 square meter per gram (m$^2$/g), from 100 to 10,000 m$^2$/g, from 100 to 800 m$^2$/g, from 100 to 700 m$^2$/g, from 400 to 12,000 m$^2$/g, from 400 to 10,000 m$^2$/g, from 400 to 800 m$^2$/g, from 100 to 1,500 m$^2$/g, from 120 to 1,000 m$^2$/g, from 150 to 850 m$^2$/g, or from 400 to 700 m$^2$/g, where the specific surface area is calculated through the Brunauer-Emmett-Teller (BET) theory. The multi-walled carbon nanotubes comprise a metal oxide percentage of 10 wt. % or less, 5 wt. % or less, 3 wt. % or less, 2 wt. % or less, 1.5 wt. % or less, 1 wt. % or less, or 0.5 wt. % or less; and a bulk density of from 0.001 to 0.12 grams per cubic centimeter (g/cm$^3$), from 0.01 to 0.08 g/cm$^3$, from 0.02 to 0.06 g/cm$^3$, from 0.01 to 1 g/cm$^3$, from 0.01 to 0.5 g/cm$^3$, from 0.01 to 0.2 g/cm$^3$, from 0.01 to 0.1 g/cm$^3$, from 0.01 to 0.05 g/cm$^3$, from 0.01 to 0.02 g/cm$^3$, from 0.02 to 1 g/cm$^3$, from 0.02 to 0.5 g/cm$^3$, from 0.02 to 0.2 g/cm$^3$, from 0.02 to 0.1 g/cm$^3$, from 0.02 to 0.05 g/cm$^3$, from 0.05 to 1 g/cm$^3$, from 0.05 to 0.5 g/cm$^3$, from 0.05 to 0.2 g/cm$^3$, from 0.05 to 0.1 g/cm$^3$, from 0.06 to 0.08 g/cm$^3$, from 0.1 to 1 g/cm$^3$, 0.1 to 0.5 g/cm$^3$, from 0.1 to 0.2 g/cm$^3$, from 0.2 to 1 g/cm$^3$, from 0.2 to 0.5 g/cm$^3$, or from 0.5 to 1 g/cm$^3$.

In embodiments, when a filler material 25 is present in the surface copolymer layer 20, the surface copolymer layer 20 may comprise composite of the copolymer material and the filler material 25, in which the filler material 25 is distributed within a matrix of the copolymer material. The composite of the copolymer and at least one filler material 25 may include from 0.01% to 10% by weight filler material 25, based on the total weight of the composite. Likewise, when a filler material 35 is present in the resin layer 30, the resin layer 30 may comprise composite of the cured resin and the filler material 35, in which the filler material 35 is distributed within a matrix of the cured resin. The composite of the cured resin and at least one filler material 35 may include from 0.01% to 10% by weight filler material, based on the total weight of the composite. In embodiments, the surface copolymer layer 20 may include from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % filler material 25 as calculated by a weight of the surface copolymer layer 20. Similarly, in embodiments, the resin layer 30 may include from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % filler material 35 as calculated by a weight of the resin layer 30.

In one illustrative embodiment of a coated proppant 100 (FIG. 1), the proppant particle 10 may comprise sand; the surface copolymer layer 20 may include a copolymer of polystyrene and poly(methyl methacrylate); and the resin layer 30 may include an epoxy resin chosen from bisphenol A epoxy resins, bisphenol F epoxy resins, Novolac epoxy resins, aliphatic epoxy resins, and glycidylamine epoxy resins.

In an illustrative embodiment of a modified-copolymer coated proppant 200 (FIG. 2A), the proppant particle 10 may comprise sand; the surface copolymer layer 20 may include a copolymer of polystyrene and poly(methyl methacrylate); the surface copolymer layer 20 may comprise composite of the copolymer and at least one filler material 25 distributed within the copolymer, the filler material 25 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these; and the resin layer 30 may include an epoxy resin chosen from bisphenol A epoxy resins, bisphenol F epoxy resins, Novolac epoxy resins, aliphatic epoxy resins, and glycidylamine epoxy resins.

In an illustrative embodiment of a modified-resin coated proppant 300 (FIG. 2B), the proppant particle 10 may comprise sand, the surface copolymer layer 20 may include a copolymer of polystyrene and poly(methyl methacrylate); the resin layer 30 may include an epoxy resin chosen from bisphenol A epoxy resins, bisphenol F epoxy resins, Novolac epoxy resins, aliphatic epoxy resins, and glycidylamine epoxy resins; and the resin layer 30 may comprise composite of the cured resin and at least one filler material 35 distributed within the epoxy resin, the filler material 35 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these.

In an illustrative embodiment of a doubly-modified coated proppant 400 (FIG. 2C), the proppant particle 10 may comprise sand, the surface copolymer layer 20 may include a copolymer of polystyrene and poly(methyl methacrylate); the surface copolymer layer 20 may comprise composite of the copolymer and at least one filler material 25 distributed within the copolymer, the filler material 25 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these; the resin layer 30 may include an epoxy resin chosen from bisphenol A epoxy resins, bisphenol F epoxy resins, Novolac epoxy resins, aliphatic epoxy resins, and glycidylamine epoxy resins; and the resin layer 30 may comprise composite of the cured resin and at least one filler material 35 distributed within the epoxy resin, the filler material 35 being chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, ZrG5 nanoparticles, and combinations of these, independently from the filler material 25 in the surface copolymer layer 20.

Figure 4:
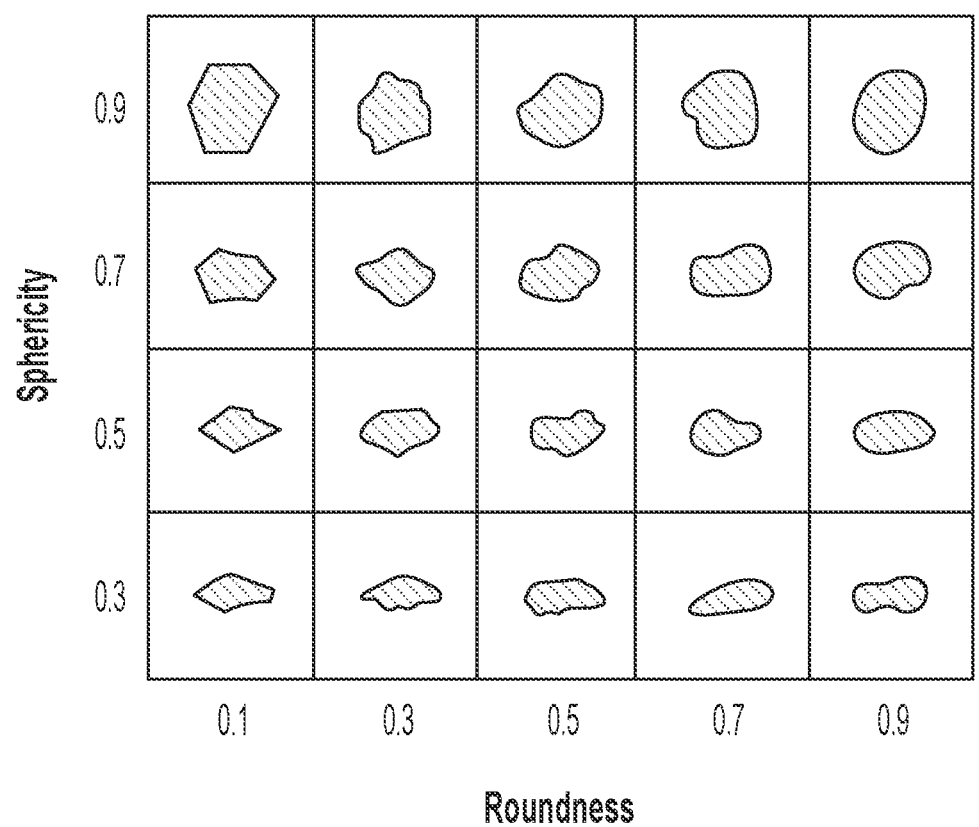
FIG. 4 is an exemplary standard table for assessing roundness values and sphericity values of proppant particles and of coated proppants, according to embodiments of this disclosure.

The coated proppants 100 according to embodiments of this disclosure may exhibit roundness and sphericity characteristics well suited for using the coated proppants 100 in hydraulic fracturing processes. In particular, the coated proppants 100 in some embodiments may have roundness values greater than 0.6, greater than 0.7, greater than 0.8, or greater than 0.9 and sphericity values also greater than 0.6, greater than 0.7, greater than 0.8, or greater than 0.9. Roundness and sphericity may be visually assessed from by optical microscopy by comparing physical characteristics of a particle against a standard table. An example standard table for assessing roundness and sphericity of particles is provided in FIG. 4.

In embodiments, the surface copolymer layer 20, the resin layer 30, or both, may further comprise a tracer material. The suitable tracer material may include, but are not limited to, ionic contrast agents such as thorium dioxide ($ThO_2$), barium sulfate ($BaSO_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. % as calculated by a weight of the surface copolymer layer 20, the resin layer 30, or both.

An elastic modulus measures a material's resistance to being deformed elastically, or non-permanently, when a stress is applied to it. The elastic modulus of an object is defined as the slope of its stress-strain curve in the elastic deformation region. A stiffer material will have a greater elastic modulus than a material that is more deformable. The equation for an elastic modulus has the generic form:

$$\lambda = \frac{stress}{strain} \quad \text{EQUATION 1}$$

where stress is the force causing the deformation divided by the area to which the force is applied and strain is the ratio of the change in some parameter caused by the deformation to the original value of the parameter. The elastic modulus of a substrate may be measured according to ASTM E111-17. The coated proppant of the present disclosure may have an elastic modulus from 3.9 to 10 Gigapascal (GPa), from 3.9 to 8 GPa, from 3.9 to 6.5 GPa, from 3.9 to 6 GPa, from 3.9 to 5.5 GPa, from 3.9 to 5 GPa, from 3.9 to 4.5 GPa, from 3.9 to 4.3 GPa, from 4.3 to 10 GPa, from 4.3 to 8 GPa, from 4.3 to 6.5 GPa, from 4.3 to 6 GPa, from 4.3 to 5.5 GPa, from 4.3 to 5 GPa, from 4.3 to 4.5 GPa, from 4.5 to 10 GPa, from 4.5 to 8 GPa, from 4.5 to 6.5 GPa, from 4.5 to 6 GPa, from 4.5 to 5.5 GPa, from 4.5 to 5 GPa, from 5 to 10 GPa, from 5 to 8 GPa, from 5 to 6.5 GPa, from 5 to 6 GPa, from 5 to 5.5 GPa, from 5.5 to 10 GPa, from 5.5 to 8 GPa, from 5.5 to 6.5 GPa, from 5.5 to 6 GPa, from 6 to 10 GPa, from 6 to 8 GPa, from 6 to 6.5 GPa, approximately 4.42 GPa, approximately 5.4 GPa, or approximately 6.27 GPa.

The hardness of a material or object may be measured by nanoindentation, also called instrumented indentation testing, using ASTM E384-17. Nanoindentation is a variety of indentation hardness tests applied to small volumes. To test the hardness of a sample, a hard tip whose mechanical properties are known (frequently made of a very hard material like diamond) is pressed into the sample to be tested. The load placed on the indenter tip is increased as the tip penetrates further into the sample until the desired load is reached. At this point, the load may be held constant for a period or removed. The area of the residual indentation in the sample is measured and the hardness, H, is defined as the maximum load, P, divided by the residual indentation area, Ar. The equation for hardness has the generic form:

$$H = \frac{P_{max}}{A_r} \quad \text{EQUATION 2}$$

The coated proppant of the present disclosure may have a hardness from 0.1 to 1 GPa, from 0.14 to 0.5 GPa, from 0.1 to 0.3 GPa, from 0.1 to 0.290 GPa, from 0.1 to 0.25 GPa, from 0.1 to 0.23 GPa, from 0.1 to 0.20 GPa, from 0.1 to 0.18 GPa, from 0.14 to 1 GPa, from 0.144 to 0.5 GPa, from 0.14 to 0.3 GPa, from 0.14 to 0.290 GPa, from 0.14 to 0.25 GPa, from 0.14 to 0.23 GPa, from 0.14 to 0.20 GPa, from 0.14 to 0.18 GPa, from 0.16 to 1 GPa, from 0.164 to 0.5 GPa, from 0.16 to 0.3 GPa, from 0.16 to 0.290 GPa, from 0.16 to 0.25 GPa, from 0.16 to 0.23 GPa, from 0.16 to 0.20 GPa, from 0.16 to 0.18 GPa, from 0.18 to 1 GPa, from 0.184 to 0.5 GPa, from 0.18 to 0.3 GPa, from 0.18 to 0.290 GPa, from 0.18 to 0.25 GPa, from 0.18 to 0.23 GPa, from 0.18 to 0.20 GPa, from 0.20 to 1 GPa, from 0.24 to 0.5 GPa, from 0.20 to 0.3 GPa, from 0.20 to 0.290 GPa, from 0.20 to 0.25 GPa, from 0.20 to 0.23 GPa, from 0.23 to 1 GPa, from 0.234 to 0.5 GPa, from 0.23 to 0.3 GPa, from 0.23 to 0.290 GPa, from 0.23 to 0.25 GPa, from 0.25 to 1 GPa, from 0.254 to 0.5 GPa, from 0.25 to 0.3 GPa, from 0.25 to 0.290 GPa, from 0.290 to 1 GPa, from 0.2904 to 0.5 GPa, from 0.290 to 0.3 GPa, approximately 0.19 GPa, approximately 0.24 GPa, or approximately 0.2908 GPa.

Glass transition is the gradual and reversible transition in amorphous materials (or in amorphous regions within semicrystalline materials), from a hard and relatively brittle "glassy" state into a viscous or rubbery state as temperature is increased. The glass-transition temperature, $T_g$, of a material characterizes the range of temperatures over which this glass transition occurs. The glass-transition temperature of a material may be measured in accordance with ASTM D3418-15. The coated proppant of the present disclosure may have a $T_g$ from 84.5° C. to 100° C., from 84.5° C. to 95° C., from 84.5° C. to 90° C., from 84.5° C. to 87.5° C., from 84.5° C. to 87° C., from 84.5° C. to 86.5° C., from 85° C. to 100° C., from 85° C. to 95° C., from 85° C. to 90° C., from 85° C. to 87.5° C., from 85° C. to 87° C., from 85° C. to 86.5° C., from 86° C. to 100° C., from 86° C. to 95° C., from 86° C. to 90° C., from 86° C. to 87.5° C., from 86° C. to 87° C., from 86° C. to 86.5° C., from 86.5° C. to 100° C., from 86.5° C. to 95° C., from 86.5° C. to 90° C., from 86.5° C. to 87.5° C., from 86.5° C. to 87° C., from 87° C. to 100° C., from 87° C. to 95° C., from 87° C. to 90° C., from 87° C. to 87.5° C., from 87.5° C. to 100° C., from 87.5° C. to 95° C., from 87.5° C. to 90° C., approximately 88° C., approximately 87.2° C., or approximately 86.7° C.

Thermal degradation refers to damaging chemical changes which take place in polymers at elevated temperatures, without the simultaneous involvement of other compounds such as oxygen. Simply put, even in the absence of air, polymers will begin to degrade if heated high enough. It is distinct from thermal-oxidation, which can usually take place at less elevated temperatures. The onset of thermal degradation dictates the maximum temperature at which a polymer can be used. At high temperatures, the components of the long chain backbone of the polymer can break (chain scission) and react with one another (cross-link) to change the properties of the polymer. These reactions result in changes to the molecular weight (and molecular weight distribution) of the polymer and can affect its properties by causing reduced ductility and increased embrittlement, chalking, scorch, color changes, cracking and general reduction in most other desirable physical properties. The degradation temperature of a material may be measured in accordance with ASTM E2550-17. In embodiments, the coated proppant may have a degradation temperature ($T_{deg}$) from 396° C. to 450° C., from 396° C. to 440° C., from 396° C. to 430° C., from 396° C. to 420° C., from 396° C. to 412° C., from 396° C. to 410° C., from 396° C. to 407° C., from 396° C. to 405° C., from 396° C. to 404° C., from 396° C. to 402° C., from 306° C. to 400° C., from 400° C. to 450° C., from 400° C. to 440° C., from 400° C. to 430° C., from 400° C. to 420° C., from 400° C. to 412° C., from 400° C. to 410° C., from 400° C. to 407° C., from 400° C. to 405° C., from 400° C. to 404° C., from 400° C. to 402° C., from 402° C. to 450° C., from 402° C. to 440° C., from 402° C. to 430° C., from 402° C. to 420° C., from 402° C. to 412° C., from 402° C. to 410° C., from 402° C. to 407° C., from 402° C. to 405° C., from 402° C. to 404° C., from 404° C. to 450° C., from 404° C. to 440° C., from 404° C. to 430° C., from 404° C. to 420° C., from 404° C. to 412° C., from 404° C. to 410° C., from 404° C. to 407° C., from 404° C. to 405° C., from 405° C. to 450° C., from 405° C. to 440° C., from 405° C. to 430° C., from 405° C. to 420° C., from 405° C. to 412° C., from 405° C. to 410° C., from 405° C. to 407° C., from 407° C. to 450° C., from 407° C. to 440° C., from 407° C. to 430° C., from 407° C. to 420° C., from 407° C. to 412° C., from 407° C. to 410° C., from 410° C. to 450° C., from 410° C. to 440° C., from 410° C. to 430° C., from 410° C. to 420° C., from 410° C. to 412° C., approximately 403° C., approximately 406° C., or approximately 411° C.

Proppants may generate fines when under pressure such as closure stress within a fracture. Reducing the amount of fines generated by proppants is desirable because fines may migrate into the formation and restrict flow conductivity of the formation. In embodiments, the coated proppant of the present disclosure has a fine production from 0.1% to 12%, from 0.1% to 10%, from 0.1% to 8%, from 0.1% to 6%, from 0.1% to 5%, from 0.1% to 4%, from 0.1% to 3%, from 0.1% to 2.5%, from 0.1% to 2.1%, from 0.1% to 2%, from 0.1% to 1.5%, from 0.1% to 1%, from 1% to 12%, from 1% to 10%, from 1% to 8%, from 1% to 6%, from 1% to 5%, from 1% to 4%, from 1% to 3%, from 1% to 2.5%, from 1% to 2.1%, from 1% to 2%, from 1% to 1.5%, from 1.5% to 12%, from 1.5% to 10%, from 1.5% to 8%, from 1.5% to 6%, from 1.5% to 5%, from 1.5% to 4%, from 1.5% to 3%, from 1.5% to 2.5%, from 1.5% to 2.1%, from 1.5% to 2%, from 2% to 12%, from 2% to 10%, from 2% to 8%, from 2% to 6%, from 2% to 5%, from 2% to 4%, from 2% to 3%, from 2% to 2.5%, from 2% to 2.1%, from 2.1% to 12%, from 2.1% to 10%, from 2.1% to 8%, from 2.1% to 6%, from 2.1% to 5%, from 2.1% to 4%, from 2.1% to 3%, from 2.1% to 2.5%, from 2.5% to 12%, from 2.5% to 10%, from 2.5% to 8%, from 2.5% to 6%, from 2.5% to 5%, from 2.5% to 4%, from 2.5% to 3%, from 3% to 12%, from 3% to 10%, from 3% to 8%, from 3% to 6%, from 3% to 5%, from 3% to 4%, from 4% to 12%, from 4% to 10%, from 4% to 8%, from 4% to 6%, from 4% to 5%, from 5% to 12%, from 5% to 10%, from 5% to 8%, from 5% to 6%, from 6% to 12%, from 6% to 10%, from 6% to 8%, from 8% to 12%, from 8% to 10%, or from 10% to 12%.

Having previously described various embodiments of coated proppants 100, methods of preparing the coated proppants 100 will now be described. Methods for preparing coated proppants may include preparing a first mixture including at least one polymerizable material and an initiator. The polymerizable material may include any of the monomers previously described. The initiator may include 2,2'-Azobis(isobutyronitrile) (AIBN), 4,4'-Azobis(4-cyanovaleric Acid) (ACBA); 1,1'Azobis-(cyclo-hex-ane-carbonitrile) (ABCN); 2,2'-Azobis(2,4-dimethyl-4-meth-oxyvaleronitrile) (V-70); Di-test-butylhyponitrite (TBHN), peroxides, or combinations thereof. In embodiments, the first mixture may additionally include a solvent, such as acetone.

The first mixture is contacted with a proppant particle to form a polymerization mixture. The polymerization mixture is heated to cure the polymerizable material and form a polymer-coated particulate comprising the proppant particle and a surface copolymer layer coating the proppant particle. In some embodiments, the coating step may include contacting the proppant particle with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the coated proppants to prevent agglomeration or clumping. The coating step may include adding another compound to the mixture, such as a solvent, an initiator, an adhesion promoter, or an additive, to form the surface copolymer layer coating the proppant particle. In some embodiments, the coating process may be conducted with an emulsion coating technique. In some embodiments, the adhesion promoter may comprise a silane (for example, amino silane) or a silane-containing monomer. In some embodiments, an adhesion promoter may not be necessary to coat the proppant particles.

A second mixture is prepared, containing the polymer-coated substrate and an uncured resin. In embodiments, the second mixture may include a solvent, such as acetone. The uncured resin may include any of the resins previously described. A curing agent is added to the second mixture to cure the uncured resin and form the coated proppant 100 (FIG. 1). In some embodiments, the coating step may include contacting the proppant particle with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the coated proppants to prevent agglomeration or clumping. The coating step may include adding another compound to the mixture, such as a solvent, an initiator, an adhesion promoter, or an additive, to form the coated proppant 100. In some embodiments, the coating process may be conducted with an emulsion coating technique. In some embodiments, the adhesion promoter may comprise a silane (for example, amino silane) or a silane-containing monomer. In some embodiments, an adhesion promoter may not be necessary to coat the proppant particles. Thus, the coated proppant included the proppant particle 10, the surface copolymer layer 20 surrounding the proppant particle 10, and a resin layer 30 surrounding the surface copolymer layer 20, the resin layer 30 comprising a cured resin.

In embodiments of methods for preparing the coated proppants 100, the at least one polymerizable material includes at least two monomers chosen from styrene, methyl methacrylate, ethylene, propylene, butylene, imides, urethanes, sulfones, carbonates, and acrylamides. The copolymer of the surface copolymer layer 20 results from the chemical polymerization reaction of the at least two monomers in the polymerization mixture.

In embodiments of methods for preparing the coated proppants 100, the uncured resin is chosen from materials that, when cured, form a cured resin chosen from bisphenol A epoxy resins, bisphenol F epoxy resins, Novolac epoxy resins, aliphatic epoxy resins, and glycidylamine epoxy resins.

In embodiments of methods for preparing the coated proppants 100, the proppant particle 10 may be any proppant particle described previously in this disclosure as the proppant particle 10 of the coated proppant 100. In some embodiments, the proppant particle 10 is a sand.

In some embodiments of methods for preparing the coated proppants 100, the first mixture, the second mixture, or both the first mixture and the second mixture, may further include at least one filler material. In such embodiments, the at least one filler material in the first mixture, the second mixture, or both the first mixture and the second mixture, may be chosen from graphene nanoparticles, graphene oxide nanoparticles, reduced graphene oxide nanoparticles, heat-reduced graphene oxide nanoparticles, carbon nanotubes, hexagonal boron nitride nanoparticles, silver nanoparticles, copper nanoparticles, zirconia nanoparticles, ZrG nanoparticles, and ZrG5 nanoparticles. It should be readily understood that any filler material present in the first mixture will be present in the surface copolymer layer 20 of the coated proppant 100. Similarly, any filler material first added into the second mixture and not present in the polymerized surface copolymer layer 20 will be present in the resin layer 30 of the coated proppant 100. In illustrative embodiments, the at least one filler material in the first mixture, the second mixture, or both the first mixture and the second mixture is chosen from graphene nanoparticles, graphene oxide nanoparticles, and hexagonal boron nitride nanoparticles.

The coated proppants 100 as previously described in this disclosure, including but not limited to coated proppants 100 prepared according to the methods described in this disclosure, may be incorporated into a hydraulic fracturing composition. Example hydraulic fracturing compositions according to embodiments may include a fluid medium; and coated proppants 100 according to one or more than one embodiment of this disclosure, dispersed within the fluid medium.

The fluid medium of the hydraulic fracturing composition may include a base fluid, not limited to one of oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination of these. Suitable aqueous-based fluids may include fresh water, saltwater (for example, water containing one or more salts dissolved in the water), brine (for example, saturated salt water), seawater, and any combination of these. Suitable aqueous-miscible fluids may include, but not be limited to, alcohols (for example, methanol, ethanol, n-propanol, isopropanol, n-butanol, sec-butanol, isobutanol, and t-butanol), glycerins, glycols (for example, polyglycols, propylene glycol, and ethylene glycol), polyglycol amines, polyols, any derivative of these, any of these in combination with salts (for example, sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination.

Further examples of the fluid medium may include water-in-oil emulsions, also known as invert emulsions, with oil-to-water ratio from a lower limit of greater than 50:50, 55:45, 60:40, 65:35, 70:30, 75:25, or 80:20 to an upper limit of less than 100:0, 95:5, 90:10, 85:15, 80:20, 75:25, 70:30, or 65:35 by volume in the base fluid, where the amount may range from any lower limit to any upper limit and encompass any subset between any of these values.

In some embodiments, the fluid medium including the coated proppants 100 may further include an additive such as a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an oxidizer, a reducer, a friction reducer, a clay stabilizing agent, and any combination of any of these.

The hydraulic fracturing compositions including the coated proppants 100 according to embodiments of this disclosure may be incorporated into methods for treating subterranean formations. Example methods for treating subterranean formations include, but are not limited to, hydraulic fracturing. Example methods for treating a subterranean formation may include producing a first rate of production of hydrocarbons from the subsurface formation and then contacting a subterranean formation with a hydraulic fracturing composition as previously described, including coated proppants 100 according to at least one embodiment of this disclosure. The methods may further include propagating at least one subterranean fracture in the subterranean formation with the hydraulic fracturing fluid. Subterranean formations such as rock, coal, or shale are treated by pumping a hydraulic fracturing fluid containing the coated proppants 100 into an opening in the formation to aid propagation of a fracture. The pressure of the injecting fluid causes the formation to fracture, and while the fluid is allowed to flow back to the surface, the coated proppants 100 remain in the fracture and prevent the formation from closing or collapsing. The methods for increasing a rate of hydrocarbon production from the subsurface formation may include increasing hydrocarbon production from the subsurface formation by producing a second rate of production of hydrocarbons from the subsurface formation, in which the second rate of production of hydrocarbons is greater than the first rate of production of hydrocarbons.

Though embodiments of the present disclosure have been discussed in the context of hydraulic fracturing processes, embodiments of the present disclosure may also be used in other industries. For instance, in some embodiments, the coated proppants 100 and the hydraulic fracturing compositions including the coated proppants 100 may be used to stimulate groundwater wells, to precondition or induce rock cave-ins for mining operations, to dispose of waste by injecting it deeply into rock, to measure stresses in the Earth's crust, to generate electricity in enhanced geothermal systems, or to increase injection rates for the geologic sequestration of carbon dioxide.

Unless otherwise defined, all technical and scientific terms used in this disclosure have the same meaning as commonly understood by one of ordinary skill in the art to which the invention belongs. The terminology used in the description is for describing particular embodiments only and is not intended to be limiting. As used in the specification and appended claims, the singular forms "a," "an," and "the" are intended to include the plural forms as well, unless the context clearly indicates otherwise.

EXAMPLES

The following examples are offered by way of illustration of the embodiments of this disclosure. One skilled in the art will recognize that the following examples are not meant to be limiting to the scope of the disclosure or its appended claims.

Example 1

Preparing Polymer-Coated Proppants

This Example demonstrates the preparation of polymer-coated proppants according to this disclosure. A 3D-crosslinked PS-PMMA/DVB polymer network coating was coated onto the surface of a microproppant via in-situ bulk polymerization. This was accomplished by copolymerizing a 1:1 ratio of S (styrene having a molecular weight ($M_w$) of 104.15 g/mol, and >99% purity, available from SigmaAldrich®, headquartered in Darmstadt, Germany) and MMA (having a $M_w$ of 100.12 g/mol and >99% purity, available from SigmaAldrich®) monomers in the presence of initiator (AIBN, having a $M_w$ of 164.21 g/mol, available from SigmaAldrich®) and the cross-linker (DVB). In this experiment, 300 g of 100 mesh sand, 5 ml of the co-monomer mixture (2.5 ml S and 2.5 ml MMA), and 100 mg AIBN was used. The cross-linking density of the polymer layer was effectively controlled by simply adjusting the DVB concentration during the preparation of the samples. When S and MMA co-monomers with cross-linker DVB were added to AIBN, the initiator dissociated into two radicals under heating conditions. With the aid of initiator radicals, the co-monomer molecules were synchronously transformed into co-monomer and cross-linker free radicals. Thereafter, the co-monomer and cross-linker free radicals turned into radical donors to the neighboring co-monomer molecules and the cross-linker. Consequently, the random addition copolymerization between S and MMA took place to produce polymer chain radicals, resulting in the growth of PS-PMMA radicals. During the course of chain propagation, the growing chains could also react with the cross-linker radicals randomly. As a result, an interpenetrating and distinctively cross-linked 3D-polymer network structures were formed. The formed network structure of PS-PMMA/DVB is highly influenced with the DVB concentration during the preparation. When the DVB concentration is increased, the cross-linking densities of the resulting polymer layer was also increased and this can be confirmed by subsequent thermal and mechanical analyses. In the second step, 8 ml of Razeen® LR 1110 epoxy resin (available from JANA, a sector of Jubail Chemical Industries LLC, a subsidiary of Nama Chemicals, headquartered in Jubail, Saudi Arabia) was mixed with 2 ml of Razeencure® 931 (a curing agent also available from JANA) and 0.1 wt. % xGnP® (a graphene filler available from XG Sciences, headquartered in Lansing, Michigan, where the wt. % of the graphene filler is calculated by weight of the resin) which was well mixed with polymer coated microppant particles. Subsequently, the resin coated sand was allowed to cure at temperature of 150° C. for 5 min. The curing caused a physical entrapment of the graphene within the cured epoxy layer improved the overall mechanical properties and stress resistance (crush resistance) of the prepared coated microppants.

Example 2

Crush Test

Figure 10:
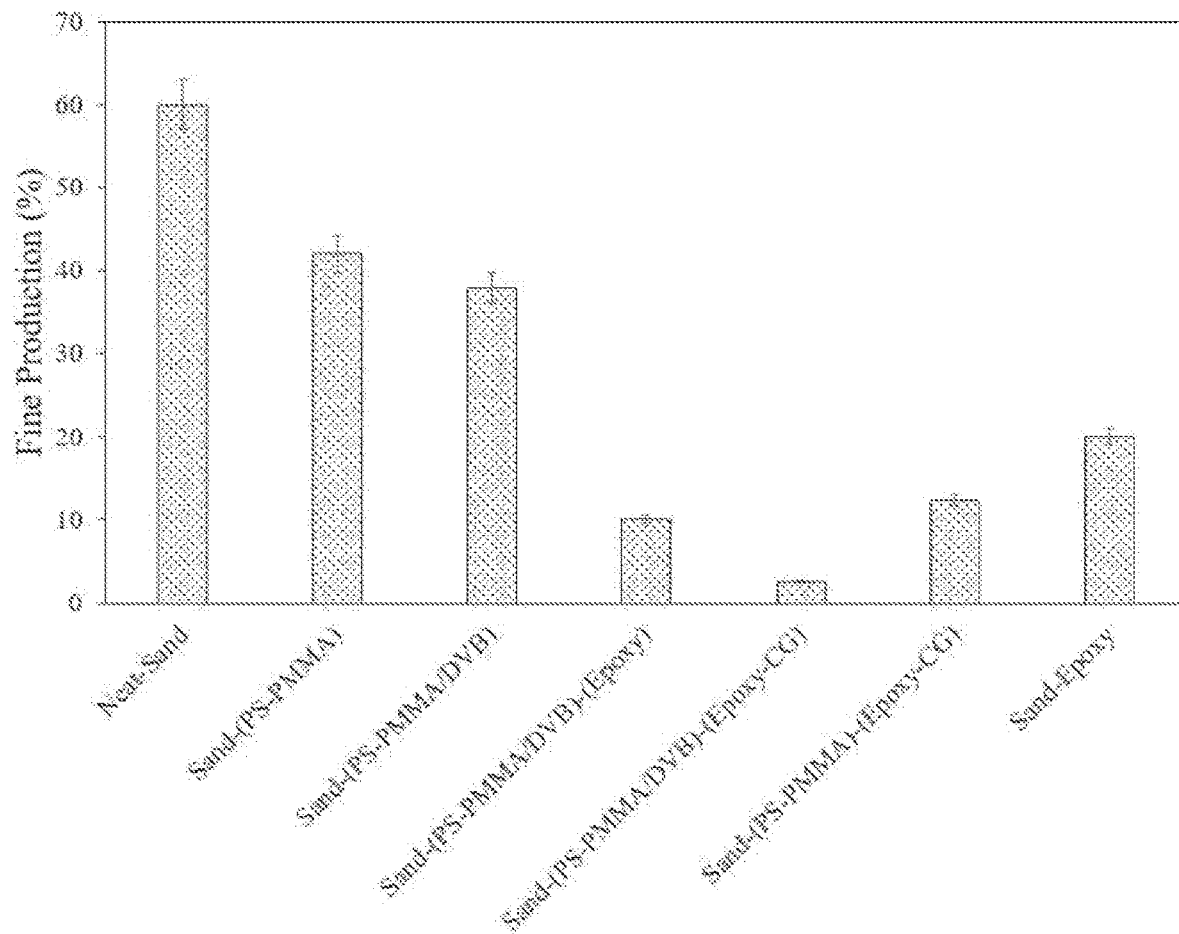
FIG. 10 graphically depicts the relationship between coatings of the present disclosure and fine production.

A hydraulic load frame (available from New England Research, Incorporated, headquartered in White River Junction, Vermont) with stress levels up to 103 MPa (15,000 psi) was used to test the crush resistance of the coated microproppant of Example 7. The samples were sieved so that all particles tested were within the specified size range. The amount of samples crushed at 10000 psi closure stress was measured and shown in FIG. 10 as crush percentage (also referred to as fine production percentage). The crush percentage was calculated by dividing the mass of crushed sample by the initial mass of the entire sample prior to conducting the crush test.

At the applied stress of 10000 psi, the neat sand produced 60% fine production. Interestingly, sand-(PS-PMMA)-(epoxy-graphene) (shown as sand-(PS-PMMA)-(epoxy-CG) in FIG. 10) gives a fine production of 12.3% and sand-(PS-PMMA/DVB)-(epoxy-graphene) (shown as sand-(PS-PMMA/DVB)-(epoxy-CG) in FIG. 10) produces as low as 2.09%. This extremely low fine production for (PS-PMMA/DVB)-(epoxy-graphene) even at a very high applied stress of 10000 psi can directly be correlated to the DVB cross-linker in the PS-PMMA polymer matrix and the constituted 3D-crosslinked polymer network structures. However, the relatively higher fine production noted for (PS-PMMA)-(epoxy-graphene) can be because of the absence of network structures. This study was conducted using ASTM Standard ISO+13503-2-2006.

Example 3

Mechanical Analyses by Nanoindentation

Nanoindentation measurements (hardness and elastic modulus) were performed using a calibrated NanoTest™ system (available from Micro Materials, headquartered in the UK) with a standard diamond Berkovich indenter. For each indentation cycle, the loading and unloading lasted 10 seconds, respectively, and the dwell time at each peak load was 5 seconds. Five measurements were performed on each specimen at the 0.1 microNewton (mN, or 100 µN) load. The force-displacement (P-h profile) data was used to evaluate the hardness (H) and the reduced elastic modulus ($E_r$). The elastic modulus ($E_i$) and Poisson ratio ($v_i$) of the diamond indenter was taken as 1140 GPa and 0.07, whereas the Poisson ratio ($v_s$) of the specimen was taken as 0.33 (considering the $v_s$ as 0.33 for PMMA for the calculations of the elastic modulus ($E_s$). In preparation for the nanoindentation test, the polymer sample was mounted onto the substrate base (steel disc) using cyanoacrylate adhesive (superglue). Nanoindentation tests on all specimens was conducted in air at room temperature (23° C.) in a temperature-controlled environment.

Figure 5:
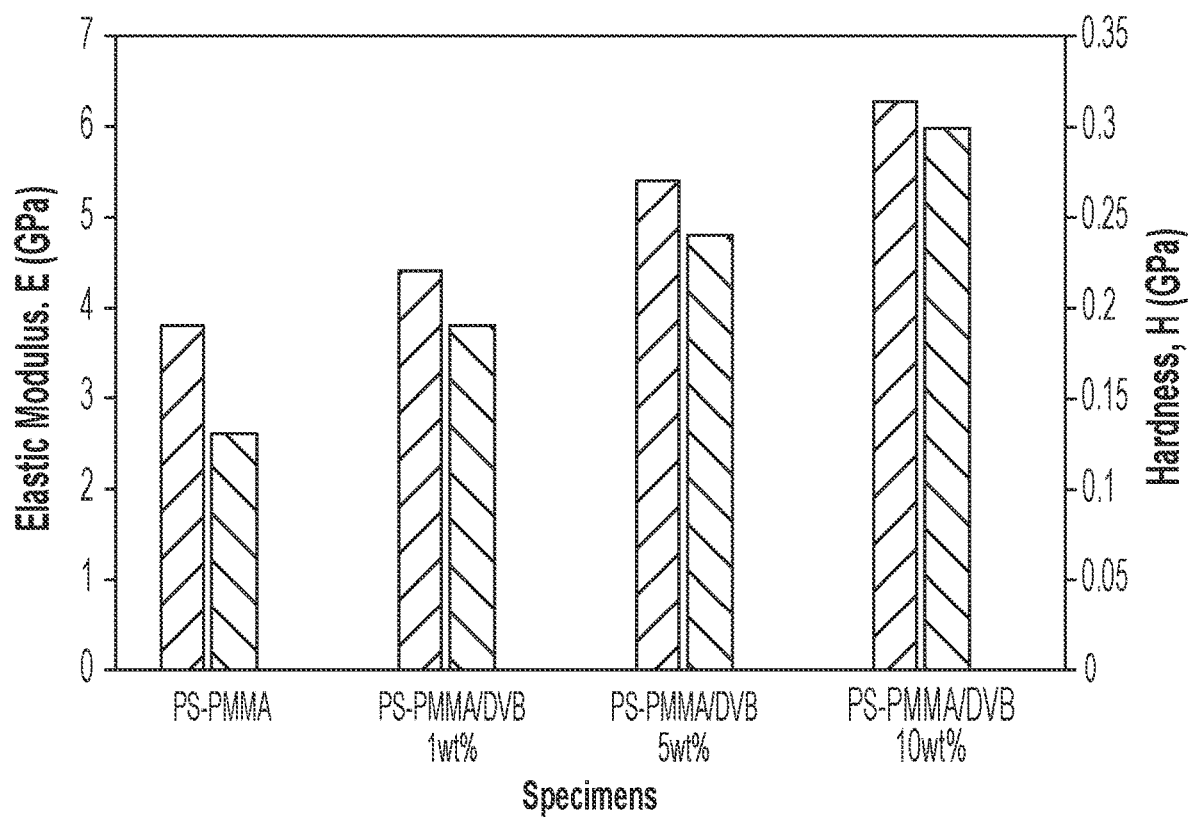
FIG. 5 graphically depicts the relationship between coatings of the present disclosure and elastic modulus and hardness.

The high stress resistance for the sand-(PS-PMMA/DVB)-(epoxy-graphene) samples is further supported by increase of hardness and elastic modulus with introduction of DVB crosslinker in PS-PMMA copolymer films. The hardness and elastic modulus of these samples are shown in FIG. 5. Also, when the DVB concentration in polymer matrix is increased from 1 wt % to 10 wt %, the hardness and elastic moduli are increased from 0.19 to 0.298 GPa and 4.42 to 6.27 GPa respectively, as seen in FIG. 5. Note that the hardness and elastic modulus of PS-PMMA copolymer films are 0.13 and 3.82 respectively. Therefore, the enhancements in the nanomechanical characteristics can be due to the formation of 3D-crosslinked porous networks.

Example 4

Thermal Analysis

The thermal stabilities of the coated microproppant samples in respect to the coating of polymer and epoxy-graphene nanocomposites were studied using thermogravimetric analyses (TGA) on a Hitachi STA7200 thermal analysis system. TGA of the prepared coated sand were recorded from 30° C. to 500° C. at a heating rate of 2° C./min under a nitrogen flow rate of 50 milliliter per minute (ml/min). Differential scanning calorimetry (DSC) was performed on a Hitachi DSC7020. The samples were heated from 30° C. to –350° C. at the rate of 5° C./min under nitrogen flow of 50 ml/min. Table 5 shows the thermal and mechanical properties of the PS-PMMA/DVB crosslinked polymer, where $T_g$=glass transition temperature; $T_{deg}$=degradation temperature; E=elastic modulus; and H=hardness/contact hardness.

TABLE 5

| Sample | DSC $T_g$ (° C.) | TGA $T_{deg}$ (° C.) | Nano-indentation | | |
|---|---|---|---|---|---|
| | | | E (GPa) | H (GPa) | H/E (ratio) |
| PS-PMMA | 84.2 | 395 | 3.82 | 0.13 | 0.034 |
| PS-PMMA/DVB 1 wt % | 86.7 | 403 | 4.42 | 0.19 | 0.043 |
| PS-PMMA/DVB 5 wt % | 87.2 | 406 | 5.4 | 0.24 | 0.044 |
| PS-PMMA/DVB 10 wt % | 88.0 | 411 | 6.27 | 0.298 | 0.048 |

Figure 6:
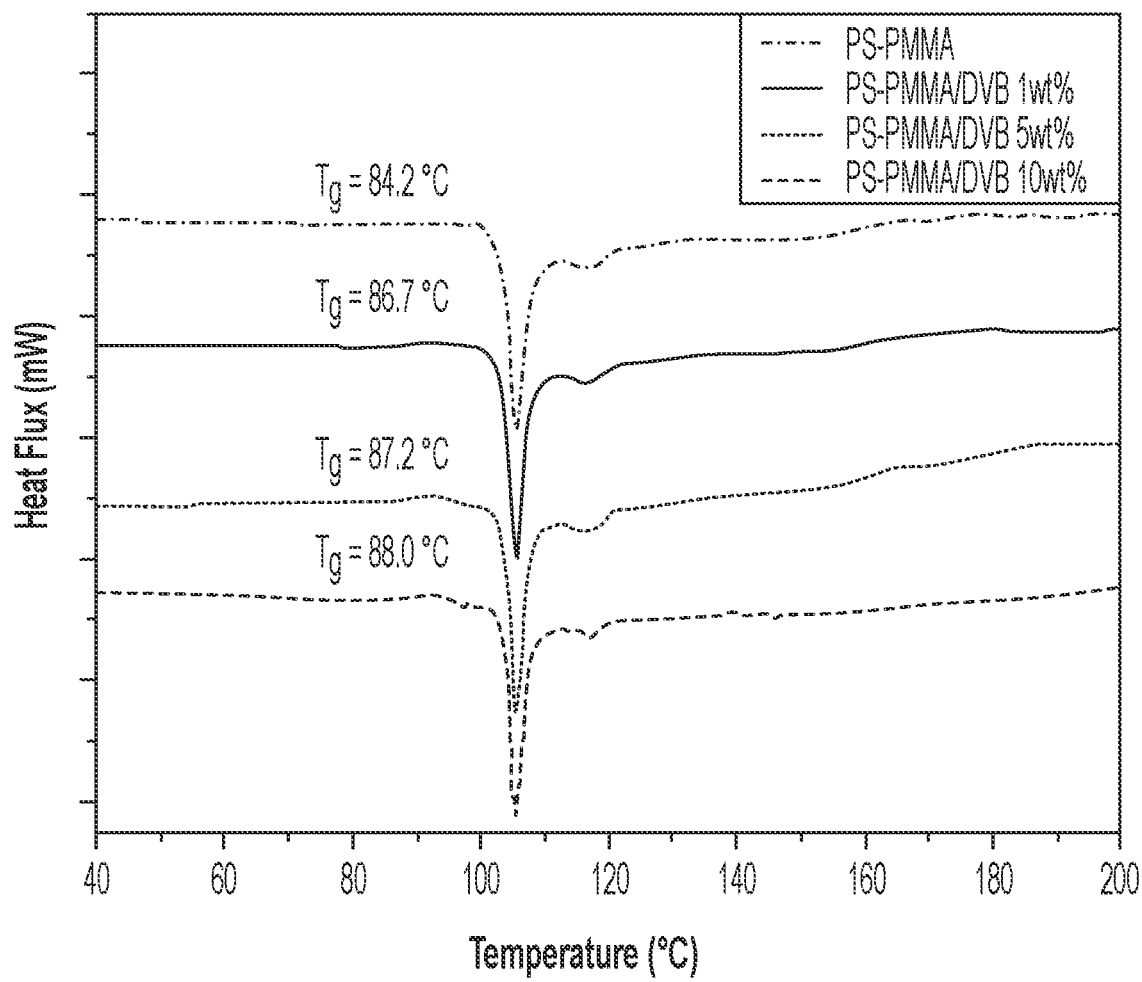
FIG. 6 graphically depicts the relationship between temperature and heat flux, according to embodiments of this disclosure.

Referring to Table 5 and FIG. 6, the DVB crosslinking with the PS-PMMA matrix was found to further enhance the thermal properties like glass transition temperatures ($T_g$) and degradation temperatures ($T_{deg}$). It is noted that, $T_g$ of the PS-PMMA/DVB polymers at different DVB weight ratios were determined as 86.7° C. (i.e. 1 wt % DVB), 87.2° C. (i.e. 5 wt % DVB) and 88.0° C. (i.e. 10 wt % DVB). Meanwhile, the $T_g$ of the PS-PMMA copolymer was recorded at 84.2° C. It is evident that the addition of DVB increased the $T_g$ of the PS-PMMA polymer. This shows that the newly formed 3D-crosslinked PS-PMMA/DVB network through DVB linkages, was able to hinder the chain mobility of the PS-PMMA/DVB matrix, thus requiring higher temperature in order for the polymer chain to move freely. Consequently, increasing the concentration of the DVB, resulted in the subsequent increase of the $T_g$. This can be credited to the increased crosslinking density of the PS-PMMA/DVB matrix that was induced by the presence of DVB. Also, further increase in DVB concentration can lead to change in the overall chemical composition of the polymer, i.e. the DVB will be incorporated into the PS-PMMA/DVB backbone and create a terpolymer, thus increasing the $T_g$.

Figure 7:
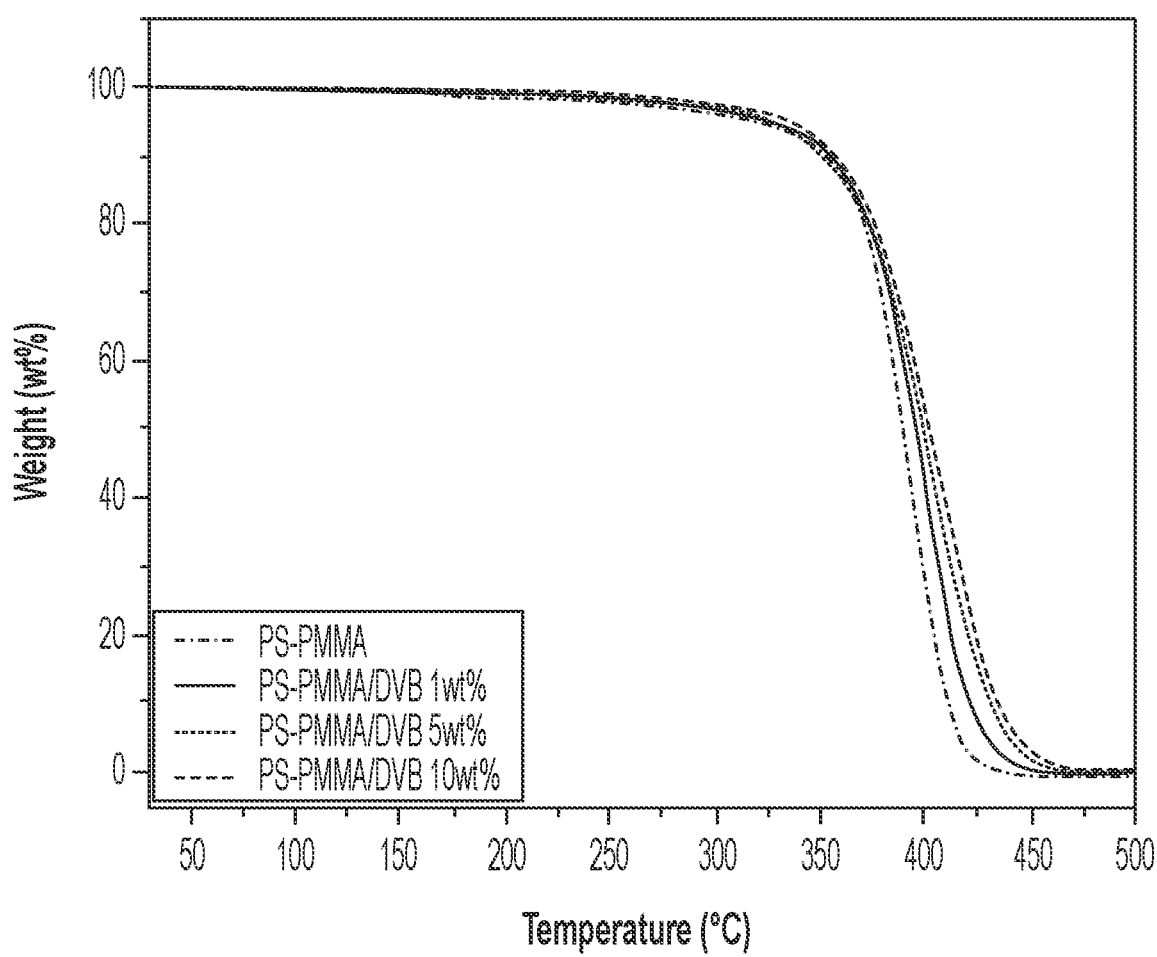
FIG. 7 graphically depicts the relationship between temperature and mass loss in terms of weight percent, according to embodiments of this disclosure.

The thermal stability of the 3D-crosslinked PS-PMMA/DVB polymer in comparison to PS-PMMA copolymer matrix was studied using TGA and the results obtained are shown in FIG. 7, in which all the synthesised polymers undergo one step degradation. The maximum weight loss was seen to take place around 395° C. due to the decomposition for the PS-PMMA backbone. However, this temperature shifted to higher value of 411° C., upon addition of DVB. This reflects the effect of DVB as a cross-linker in the PS-PMMA/DVB matrix, enhancing its thermal stability. Similar to $T_g$, the $T_{deg}$ of the PS-PMMA/DVB was increased with increase in DVB concentration Example 5

Field Emission Scanning Electron Microscopy (FE-SEM)

The FE-SEM was used to visualize the coated microproppant at the nanometer scale. This was done to compare potential morphological and shape changes among the coated and non-coated microproppants. The samples were viewed at an accelerating voltage of 10 kV.

From the FE-SEM images of the coated and un-coated microproppants at different magnification it was evident that the proppants of the present disclosure had an excellent roundness and sphericity. It was shown that microproppant (100 mesh sand) could be coated grain by grain with no aggregation. However, with the conventional resin coating method, clusters of sand grains embedded inside resins were formed for most of the sand. Therefore, it was concluded that the surface polymerization method of the present disclosure is effective for coating microproppants without aggregation.

Example 6

XRD Analysis

Figure 8:
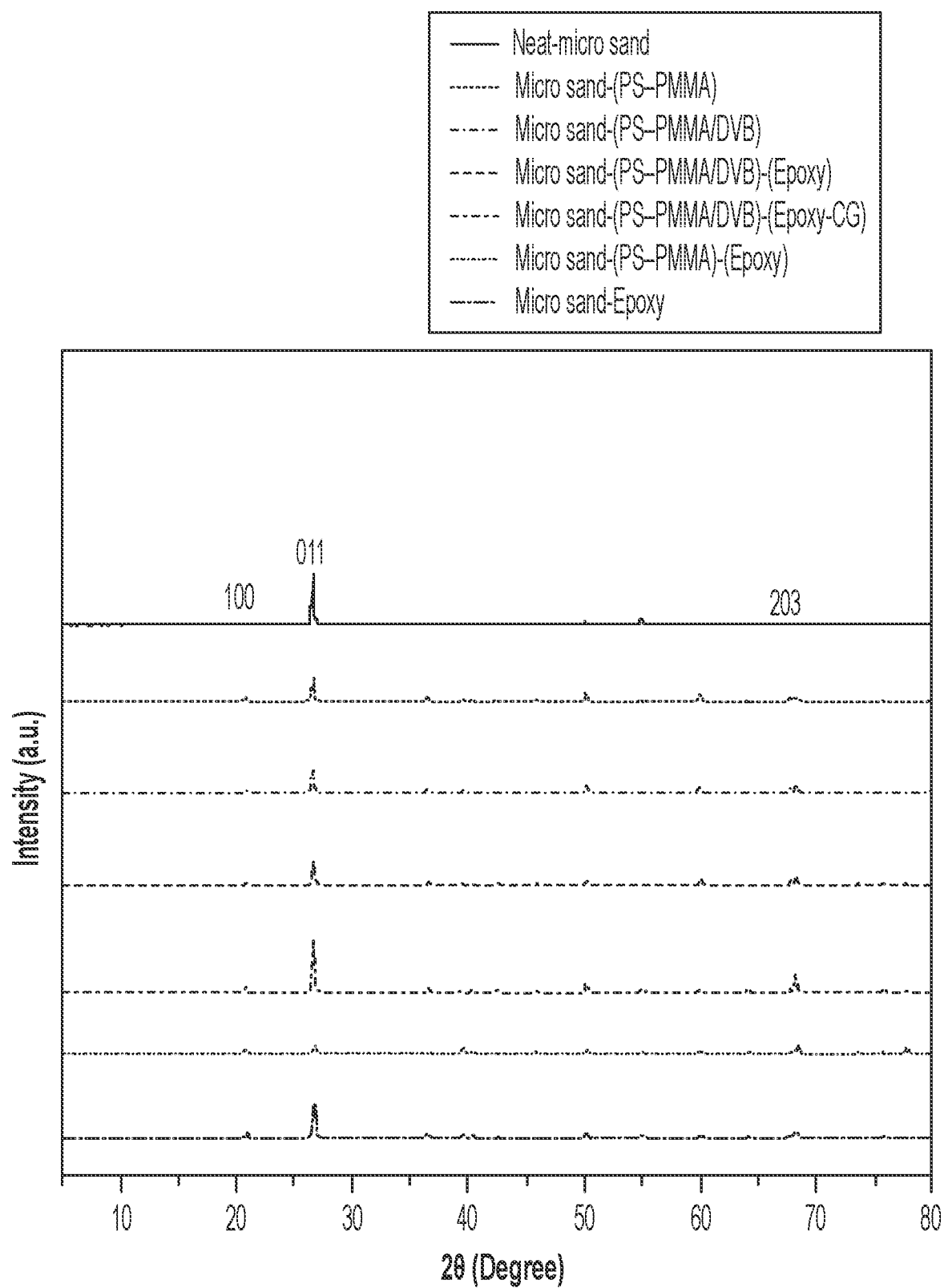
FIG. 8 graphically depicts intensity, according to embodiments of this disclosure.

FIG. 8 depicts the XRD patterns for neat micro-proppants and micro-proppants coated with epoxy, PS-PMMA, PS-PMMA/DVB, (PS-PMMA)-Epoxy, (PS-PMMA/DVB)-Epoxy, and (PS-PMMA/DVB)-(Epoxy-CG). For the neat microsand, peaks were detected at 21°, 26.5°, 42.7°, 46°, 50°, 60°, 64°, 68° which are attributed to the quartz phase ($SiO_2$). As for the coated microsand, the major peak at 26.5° (011) had a lower intensity in comparison to that of neat microsand. This can be explained by the successful surface coverage of the PS-PMMA copolymer onto the microsand particles. The intensity of the peak tended to further decrease for PS-PMMA/DVB coated sand samples. This can be accounted for the successful formation of 3D network structures. When the second composite layer of epoxy was introduced in top of the PS-PMMA/DVB layer for the microsand proppant samples, the intensity of the peak reached the lowest value. This systematic reduction of the intensities of the characteristic peak (011) of sand particles with the sequential composite coatings indicated that there was effective surface coverage of the coated microsand proppants.

Example 7

FTIR Analysis

Figure 9:
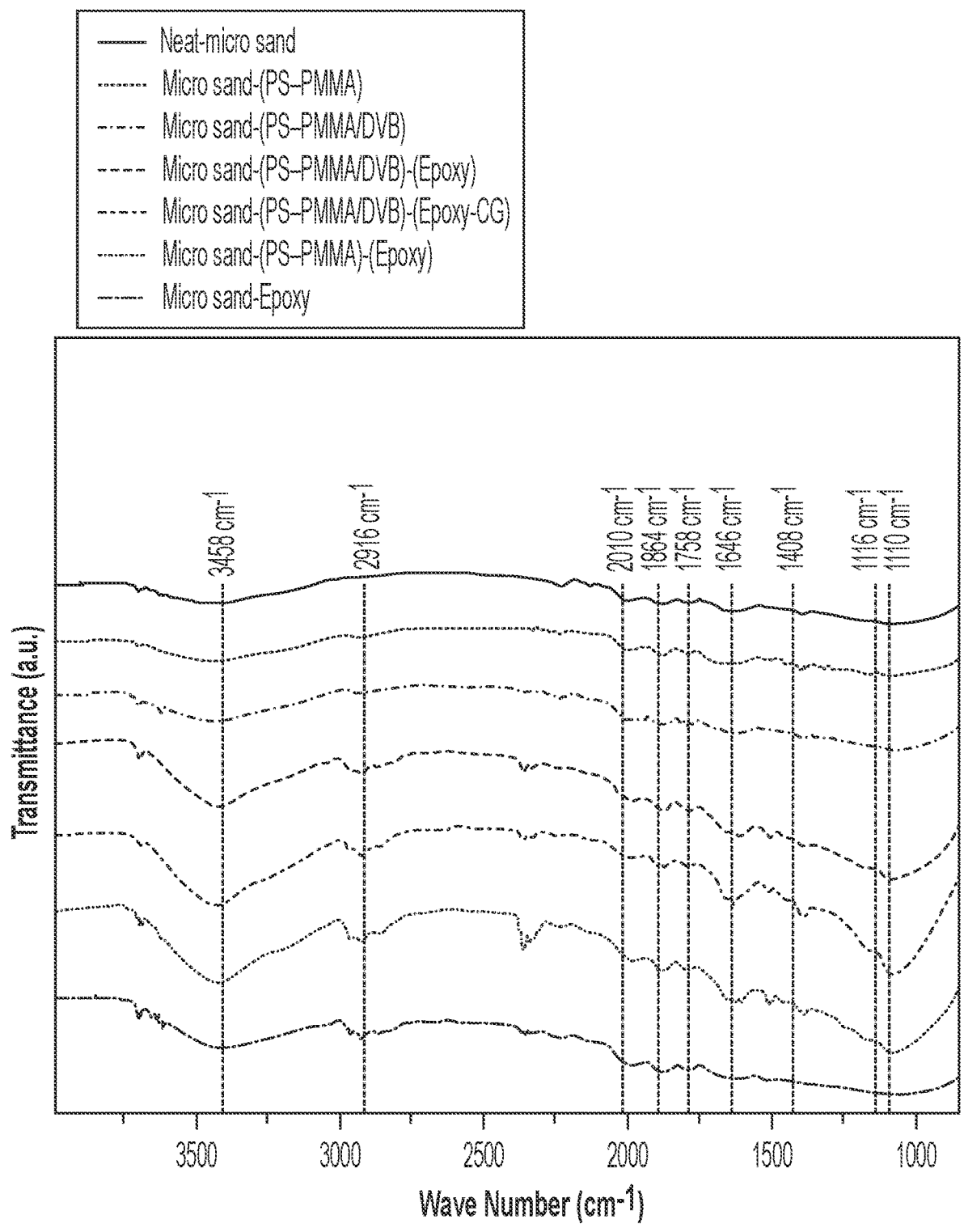
FIG. 9 graphically depicts the relationship between wave number and transmittance, according to embodiments of this disclosure.

FIG. 9 shows the FTIR spectra for neat micro-proppants and micro-proppants coated with epoxy, PS-PMMA, PS-PMMA/DVB, (PS-PMMA)-Epoxy, (PS-PMMA/DVB)-Epoxy, and (PS-PMMA/DVB)-(Epoxy-CG). The PS-PMMA copolymer is detected using the characteristics peaks at 1116 $cm^{-1}$ (i.e. for the stretching mode of C—O—C), at 1408 cm' and 2916 cm' (i.e. for the bending and stretching modes of the —$CH_3$ group, respectively), at 1646 cm' (i.e. for stretching mode of C=C bond in the PS) and 1758 cm' (i.e. for the C=O in the PMMA). The CG in the composite layers were identified by the characteristic peaks at 2916 $cm^{-1}$ and 2865 $cm^{-1}$ (C—H stretch vibrations of —$CH_2$). All the coated sand proppants were observed to have similar FTIR spectra, whereby the peaks detected around 1700 and 1450 $cm^{-1}$ indicate the presence of stretching mode of C=O and C—O, respectively. These groups are typically from the PS-PMMA copolymer and crosslinked epoxy that are used to coat the sand. Another common peak detected for all the samples was around 3458 $cm^{-1}$ which is attributed to the —OH bond originating from the sand and polymer composites. Another common peak detected for all the samples was around 1100 cm' which is attributed to the Si—O—Si bond originating from the quartz phase of sand.

It is noted that the terms "substantially" and "about" may be utilized herein to represent the inherent degree of uncertainty that may be attributed to any quantitative comparison, value, measurement, or other representation. These terms are also utilized in this disclosure to represent the degree by which a quantitative representation may vary from a stated reference without resulting in a change in the basic function of the subject matter at issue.

While particular embodiments have been illustrated and described in this disclosure, it should be understood that various other changes and modifications may be made without departing from the scope of the claimed subject matter. Moreover, although various aspects of the claimed subject matter have been described in this disclosure, such aspects need not be utilized in combination. It is therefore intended that the appended claims cover all such changes and modifications that are within the scope of the claimed subject matter.

What is claimed is:

1. A method of preparing a coated proppant, the method comprising:
   preparing a first mixture comprising a polymerizable material, an initiator, and a crosslinker comprising divinyl benzene;
   contacting the first mixture to a proppant particle to form a polymerization mixture;
   heating the polymerization mixture to cure the polymerizable material and form a polymer-coated proppant particle comprising the proppant particle and a surface copolymer layer crosslinked via divinyl benzene;
   preparing a second mixture comprising the polymer-coated substrate and an uncured resin; and
   adding a curing agent to the second mixture to cure the uncured resin and form the coated proppant, the coated proppant comprising the proppant particle, the surface copolymer layer surrounding the proppant particle, and a resin layer surrounding the surface copolymer layer, the resin layer comprising a cured resin, and wherein:
   the surface copolymer layer has an interpenetrating 3D-crosslinked polymer network structure surrounding the proppant particle;
   the coated proppant has a fine production of from 0.1% to 10% at a closure stress of 10,000 psi.

2. The method of claim 1, wherein:
   the polymerizable material comprises at least two monomers chosen from styrene, methyl methacrylate, ethylene, propylene, butylene, imides, urethanes, sulfones, carbonates, and acrylamides;
   the initiator comprises 2,2'-Azobis(isobutyronitrile) (AIBN), 4,4'-Azobis(4-cyanovaleric Acid) (ACBA); 1,1'Azobis-(cyclohexanecarbonitrile) (ABCN); 2,2'-Azobis(2,4-dimethyl-4-methoxyvaleronitrile) (V-70); Di-Cert-butylhyponitrite (TBHN), peroxides, or combinations thereof;
   the uncured resin is chosen from bisphenol A epoxy resins, bisphenol F epoxy resins, novolac epoxy resins, aliphatic epoxy resins, glycidylamine epoxy resins, and polyepoxide resins;
   the proppant particle comprises oxide, silicate, sand, ceramic, resin, plastic, mineral, glass, silica, alumina, fumed carbon, carbon black, graphite, mica, titania, zirconia, boron, fly ash, or combinations thereof; or combinations thereof.

3. The method of claim 1, wherein:
   the polymerizable material comprises styrene monomer and methyl methacrylate monomer;
   the crosslinker comprises divinyl benzene; and
   the initiator comprises 2,2'-Azobis(isobutyronitrile) (AIBN).

4. The method of claim 2, wherein the resin layer further comprises a filler material comprising silica, alumina, mica, graphene, vanadium pentoxide, zinc oxide, calcium carbonate, zirconium oxide, and nano-reinforcing material.

5. The method of claim 4, wherein the coated proppant has a fine production of from 0.1% to 2.1% at a closure stress of 10,000 psi.

6. The method of claim 2, wherein the resin layer further comprises a nano-reinforcing material comprising carbon nanotubes, nano silica, nano alumina, nano mica, nanoclay, boron nitride nanotubes, nano vanadium pentoxide, nano zinc oxide, nano calcium carbonate, graphene nanoparticles, graphene oxide nanoparticles, reduced graphene oxide nanoparticles, heat-reduced graphene oxide nanoparticles, hexagonal boron nitride nanoparticles, silver nanoparticles, copper nanoparticles, zirconia nanoparticles, ZrG nanoparticles, ZrG5 nanoparticles, or combinations thereof.

7. The method of claim 6, wherein the resin layer comprises from 0.01 to 10 wt. % nano-reinforcing material by weight of the resin layer.

8. The method of claim 1, wherein the coated proppant has:
   a hardness from 0.14 to 1 GPa, an elastic modulus from 3.9 to 10 GPa, or both;
   a glass transition temperature ($T_g$) from 84.5° C. to 100° C.;
   a degradation temperature ($T_{deg}$) from 396° C. to 450° C.; or
   combinations thereof.

9. The method of claim 1, wherein the coated proppant comprises from 0.1 to 20 wt. % divinyl benzene by weight of the surface copolymer layer.

10. The method of claim 1, wherein the surface copolymer layer, the resin layer, or both further comprise a tracer material comprising thorium dioxide ($ThO_2$), barium sulfate ($BaSO_4$), diatrizoate, metrizoate, iothalamate, ioxaglate, iopamidol, iohexol, ioxilan, iopromide, iodixanol, ioversol, or combinations thereof.

11. A method for increasing a rate of hydrocarbon production from a subsurface formation comprising:
   producing a first rate of production of hydrocarbons from the subsurface formation;
   introducing a hydraulic fracturing fluid comprising a plurality of coated proppants into the subsurface formation; and
   increasing hydrocarbon production from the subsurface formation by producing a second rate of production of hydrocarbons from the subsurface formation, in which the second rate of production of hydrocarbons is greater than the first rate of production of hydrocarbons, and wherein
   each of the plurality of coated proppants comprises a proppant particle, a surface copolymer layer surrounding the proppant particle, and a resin layer surrounding the surface copolymer layer,
   the surface copolymer layer comprises a copolymer of at least two monomers chosen from styrene, methyl methacrylate, ethylene, propylene, butylene, imides, urethanes, sulfones, carbonates, and acrylamides,
   the resin layer comprises a cured resin,
   the surface copolymer layer has an interpenetrating 3D-crosslinked polymer network structure crosslinked by divinyl benzene, and
   each of the plurality of the coated proppants has a fine production of from 0.1% to 10% at a closure stress of 10,000 psi.

12. The method of claim 11, wherein:
   the polymerizable material comprises at least two monomers chosen from styrene, methyl methacrylate, ethylene, propylene, butylene, imides, urethanes, sulfones, carbonates, and acrylamides;
   the initiator comprises 2,2'-Azobis(isobutyronitrile) (AIBN), 4,4'-Azobis(4-cyanovaleric Acid) (ALBA); 1,1'Azobis-(cyclohexanecarbonitrile) (ABCN); 2,2'-

Azobis(2,4-dimethyl-4-methoxyvaleronitrile) (V-70); Di-tert-butylhyponitrite (TBHN), peroxides, Or combinations thereof;

the uncured resin is chosen from bisphenol A epoxy resins, bisphenol F epoxy resins, novolac epoxy resins, aliphatic epoxy resins, glycidylamine epoxy resins, and polyepoxide resins;

the proppant particle comprises oxide, silicate, sand, ceramic, resin, plastic, mineral, glass, silica, alumina, fumed carbon, carbon black, graphite, mica, titania, zirconia, boron, fly ash, or combinations thereof; or combinations thereof.

13. The method of claim 11, wherein:

the polymerizable material comprises styrene monomer and methyl methacrylate monomer;

the crosslinker comprises divinyl benzene; and the initiator comprises 2,2'-Azobis(isobutyronitrile) (AIBN).

14. The method of claim 12, wherein the resin layer further comprises a filler material comprising silica, alumina, mica, graphene, vanadium pentoxide, zinc oxide, calcium carbonate, zirconium oxide, and nano-reinforcing material.

15. The method of claim 14, wherein the coated proppant has a fine production of from 0.1% to 2.1% at a closure stress of 10,000 psi.

16. The method of claim 12, wherein the resin layer further comprises a nano-reinforcing material comprising carbon nanotubes, nano silica, nano alumina, nano mica, nanoclay, boron nitride nanotubes, nano vanadium pentoxide, nano zinc oxide, nano calcium carbonate, graphene nanoparticles, graphene oxide nanoparticles, reduced graphene oxide nanoparticles, heat-reduced graphene oxide nanoparticles, hexagonal boron nitride nanoparticles, silver nanoparticles, copper nanoparticles, zirconia nanoparticles, ZrG nanoparticles, ZrG5 nanoparticles, or combinations thereof.

17. The method of claim 16, wherein the resin layer comprises from 0.01 to 10 wt. % nano-reinforcing material by weight of the resin layer.

18. The method of claim 11, wherein the coated proppant has:

a hardness from 0.14 to 1 GPa, an elastic modulus from 3.9 to 10 GPa, or both;

a glass transition temperature ($T_g$) from 84.5° C. to 100° C.;

a degradation temperature ($T_{deg}$) from 396° C. to 450° C.; or combinations thereof.

19. The method of claim 11, wherein the coated proppant comprises from 0.1 to 20 wt. % divinyl benzene by weight of the surface copolymer layer.

20. The method of claim 11, wherein the surface copolymer layer, the resin layer, or both further comprise a tracer material comprising thorium dioxide ($ThO_2$), barium sulfate ($BaSO_4$), diatrizoate, metrizoate, iothalamate, ioxaglate, iopamidol, iohexol, ioxilan, iopromide, iodixanol, ioversol, or combinations thereof.

* * * * *